(12) United States Patent
Lee et al.

(10) Patent No.: US 11,140,711 B2
(45) Date of Patent: Oct. 5, 2021

(54) METHOD FOR DOWNLINK RECEPTION AND USER EQUIPMENT USING THE SAME

(71) Applicant: Acer Incorporated, New Taipei (TW)

(72) Inventors: Chien-Min Lee, New Taipei (TW); Li-Chung Lo, New Taipei (TW)

(73) Assignee: Acer Incorporated, New Taipei (TW)

( * ) Notice: Subject to any disclaimer, the term of this patent is extended or adjusted under 35 U.S.C. 154(b) by 141 days.

(21) Appl. No.: 16/529,750

(22) Filed: Aug. 1, 2019

(65) Prior Publication Data
US 2020/0053775 A1 Feb. 13, 2020

Related U.S. Application Data

(60) Provisional application No. 62/715,802, filed on Aug. 8, 2018.

(51) Int. Cl.
| | |
|---|---|
| *H04W 74/08* | (2009.01) |
| *H04L 1/00* | (2006.01) |
| *H04L 5/00* | (2006.01) |
| *H04W 16/14* | (2009.01) |
| *H04W 56/00* | (2009.01) |
| *H04W 72/04* | (2009.01) |

(52) U.S. Cl.
CPC ....... *H04W 74/0808* (2013.01); *H04L 1/0026* (2013.01); *H04L 5/0051* (2013.01); *H04W 16/14* (2013.01); *H04W 56/001* (2013.01); *H04W 72/042* (2013.01); *H04W 72/046* (2013.01)

(58) Field of Classification Search
CPC .............. H04L 1/0026; H04L 5/0051; H04W 74/0808; H04W 72/042; H04W 16/14; H04W 72/046; H04W 56/001; H04B 7/0617
See application file for complete search history.

(56) References Cited

U.S. PATENT DOCUMENTS

| | | | |
|---|---|---|---|
| 7,006,849 B2 | 2/2006 | Li et al. | |
| 2010/0097950 A1 | 4/2010 | Jeon | |
| 2016/0087708 A1 | 3/2016 | Kang et al. | |
| 2016/0165575 A1* | 6/2016 | Park | H04B 7/0404 370/329 |
| 2017/0041106 A1* | 2/2017 | Srivastava | H04L 5/0064 |
| 2019/0069285 A1* | 2/2019 | Chandrasekhar | H04B 7/0695 |
| 2019/0239093 A1* | 8/2019 | Zhang | H04L 5/001 |
| 2020/0028563 A1* | 1/2020 | Gao | H04L 5/0048 |

FOREIGN PATENT DOCUMENTS

WO 2017083514 5/2017

OTHER PUBLICATIONS

ETSI TS 138 214 V15.2.0, "5G; NR; Physical layer procedures for data." 3GPP TS 38.214 version 15.2.0 Release 15, Jul. 2018, pp. 1-95.
"Search Report of Europe Counterpart Application", dated Dec. 2, 2019, p. 1-p. 8.

\* cited by examiner

*Primary Examiner* — Anez C Ebrahim
(74) *Attorney, Agent, or Firm* — JCIPRNET

(57) ABSTRACT

A method for downlink reception in an unlicensed band and a user equipment using the same method are provided. The method includes: receiving an indication for indicating whether a channel correlated with a spatial domain reference signal is available; and accessing the channel if the indication indicates the channel is available.

28 Claims, 23 Drawing Sheets

METHOD FOR DOWNLINK RECEPTION AND USER EQUIPMENT USING THE SAME

CROSS-REFERENCE TO RELATED APPLICATION

This application claims the priority benefit of U.S. provisional application Ser. No. 62/715,802, filed on Aug. 8, 2018. The entirety of the above-mentioned patent application is hereby incorporated by reference herein and made a part of this specification.

BACKGROUND

Technical Field

The disclosure relates to a method for downlink (DL) reception and a user equipment (UE) using the same method.

Description of Related Art

In a fifth generation (5G) network, a UE can communicate to other devices through an unlicensed band. In order to offer better performance, some aspects of the 5G network communication system may apply beamforming technology to achieve a significant refinement. FIG. 1 is a schematic diagram of a communication network framework based on beamforming technology. In FIG. 1, the UE is located in an area which is served by multiple beams such as beams 1 and 3 corresponding to the 5G base station (gNB), and beam 2 corresponding to the transmission reception point (TRP). It would be difficult for the UE to identify the beam occupying a DL channel currently serving the UE since each of the beams 1-3 is possible to occupy the DL channel currently serving the UE. Accordingly, it is necessary to provide a method for UE to perform DL reception efficiently in an area serving by multiple DL beams.

SUMMARY

The disclosure is directed to a method for downlink (DL) reception and a user equipment (UE) using the same method.

The disclosure provides a method for downlink reception used by a user equipment, comprising: receiving an indication for indicating whether a channel correlated with a spatial domain reference signal is available; and accessing the channel if the indication indicates the channel is available.

In an embodiment of the disclosure, the step of accessing the channel if the indication indicates the channel is available comprising: accessing the channel by using a spatial domain receive filter corresponding to the spatial domain reference signal.

In an embodiment of the disclosure, the downlink reception is performed in an unlicensed band.

In an embodiment of the disclosure, the method further comprising: receiving the indication by using a spatial domain receive filter corresponding to the spatial domain reference signal.

In an embodiment of the disclosure, the downlink reception is performed by the user equipment on a bandwidth part of a serving cell.

In an embodiment of the disclosure, the spatial domain reference signal is one of a synchronization signal block and a channel state information reference signal.

In an embodiment of the disclosure, the step of receiving the indication for indicating whether the channel correlated with the spatial domain reference signal is available comprising: obtaining the indication from a at least one downlink reference signal.

In an embodiment of the disclosure, the at least one downlink reference signal comprises a first downlink reference signal and a second downlink reference signal, wherein the first downlink reference signal and the second downlink reference signal are respectively allocated in at least one of different time-division multiplexed resources, different frequency-division multiplexed resources, different spatial-division multiplexed resources, or different code-division multiplexed resources.

In an embodiment of the disclosure, the at least one downlink reference signal is configured within a bandwidth part pre-configured to the user equipment.

In an embodiment of the disclosure, a bandwidth of the at least one downlink reference signal is above 80 percentage of 20 MHz.

In an embodiment of the disclosure, the at least one downlink reference signal is transmitted by a single antenna port.

In an embodiment of the disclosure, the at least one downlink reference signal is a channel state information reference signal.

In an embodiment of the disclosure, the step of receiving the indication for indicating the channel correlated with the spatial domain reference signal is available comprising: obtaining the indication from a downlink control information.

In an embodiment of the disclosure, the indication comprises a data bit, and the data bit indicates whether the channel corresponding to the spatial domain reference signal is available.

In an embodiment of the disclosure, the method further comprising: determining, according to the indication, priorities of a plurality of search spaces from small index to large index.

In an embodiment of the disclosure, a first search space of the plurality of search spaces has higher priority than a second search space of the plurality of search spaces if the first search space is available and the second search spaces is not available.

In an embodiment of the disclosure, a search space is available if the corresponding spatial domain reference signal is available.

In an embodiment of the disclosure, the method further comprising: determining, according to the indication, whether each of a plurality of search spaces is available.

In an embodiment of the disclosure, the downlink control information comprise at least one of the following: number of slots within the channel; number of time slots comprising an uplink resource within the channel; number of time slots comprising a downlink resource within the channel; number of uplink symbols in at least one time slot within the channel; and number of downlink symbols in at least one time slot within the channel.

In an embodiment of the disclosure, the method further comprising: obtaining a resource location of a physical downlink shared channel in a time slot from a downlink control information.

In an embodiment of the disclosure, the method further comprising: determining a quasi co-location assumption of the physical downlink shared channel according to at least one of the indication and or an identity (ID) of a control resource set.

In an embodiment of the disclosure, a timing offset between the downlink control information and the physical downlink shared channel is less than a time threshold.

In an embodiment of the disclosure, a timing offset between the downlink control information and the physical downlink shared channel is larger than a time threshold.

In an embodiment of the disclosure, the downlink control information and the physical downlink shared channel are transmitted in different data bursts.

In an embodiment of the disclosure, the control resource set has the lowest control resource set ID among a plurality of available control resource sets.

In an embodiment of the disclosure, the method further comprising: determining, according to the indication, whether each of a plurality of control resource set is available.

In an embodiment of the disclosure, the plurality of available control resource sets are received in the time slot.

In an embodiment of the disclosure, the plurality of available control resource sets are received in a previous time slot.

The disclosure provides a user equipment comprising a transceiver and a processor connects to the transceiver. The processor is configured at least to: receive, via the transceiver, an indication for indicating whether a channel correlated with a spatial domain reference signal is available; and access, via the transceiver, the channel if the indication indicates the channel is available.

Based on the above, the disclosure provides a method for a UE to perform DL reception in an unlicensed band in case of the UE is located in an area served by multiple beams. The UE can determine the appropriate spatial domain receive filter for the DL reception.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
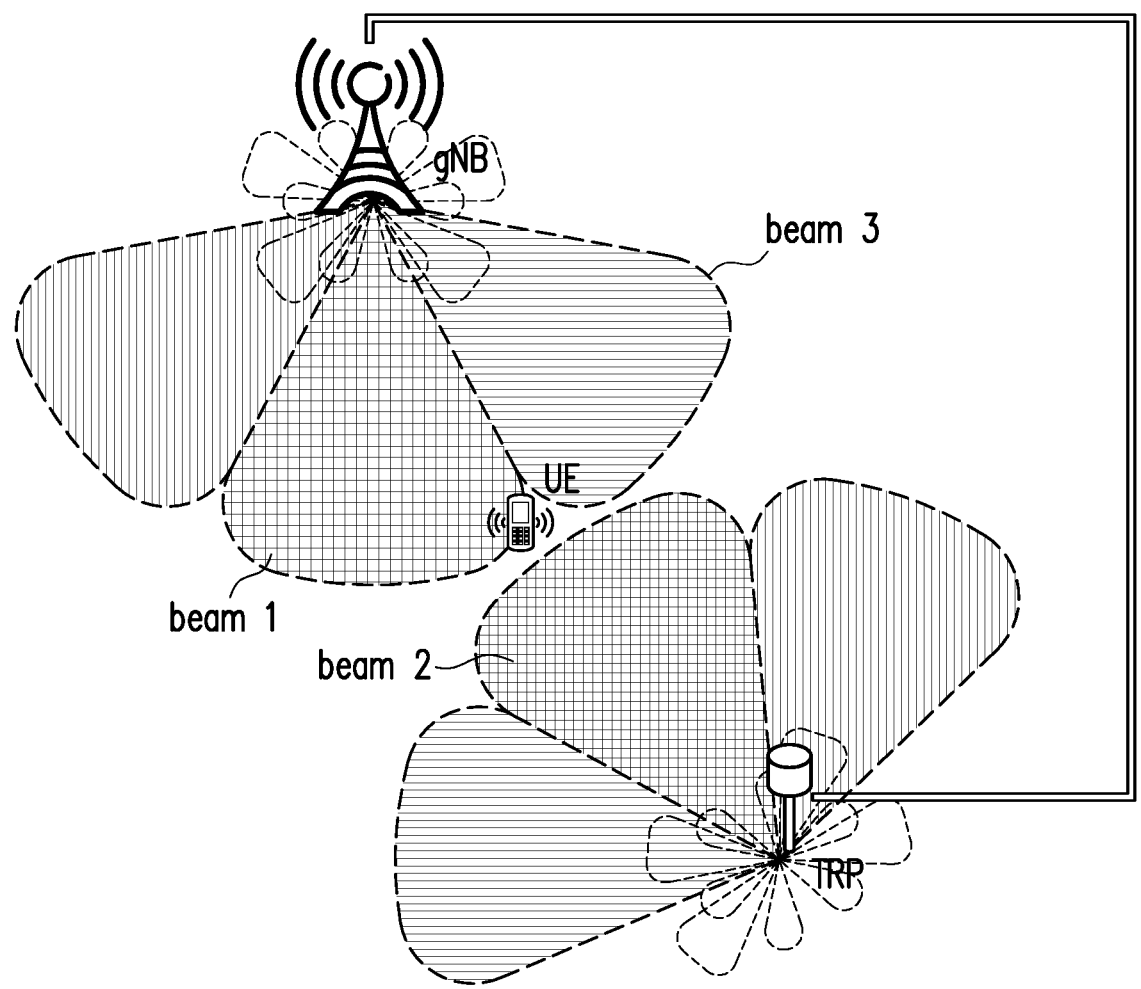
FIG. 1 is a schematic diagram of a communication network framework based on beamforming technology.
Figure 2:
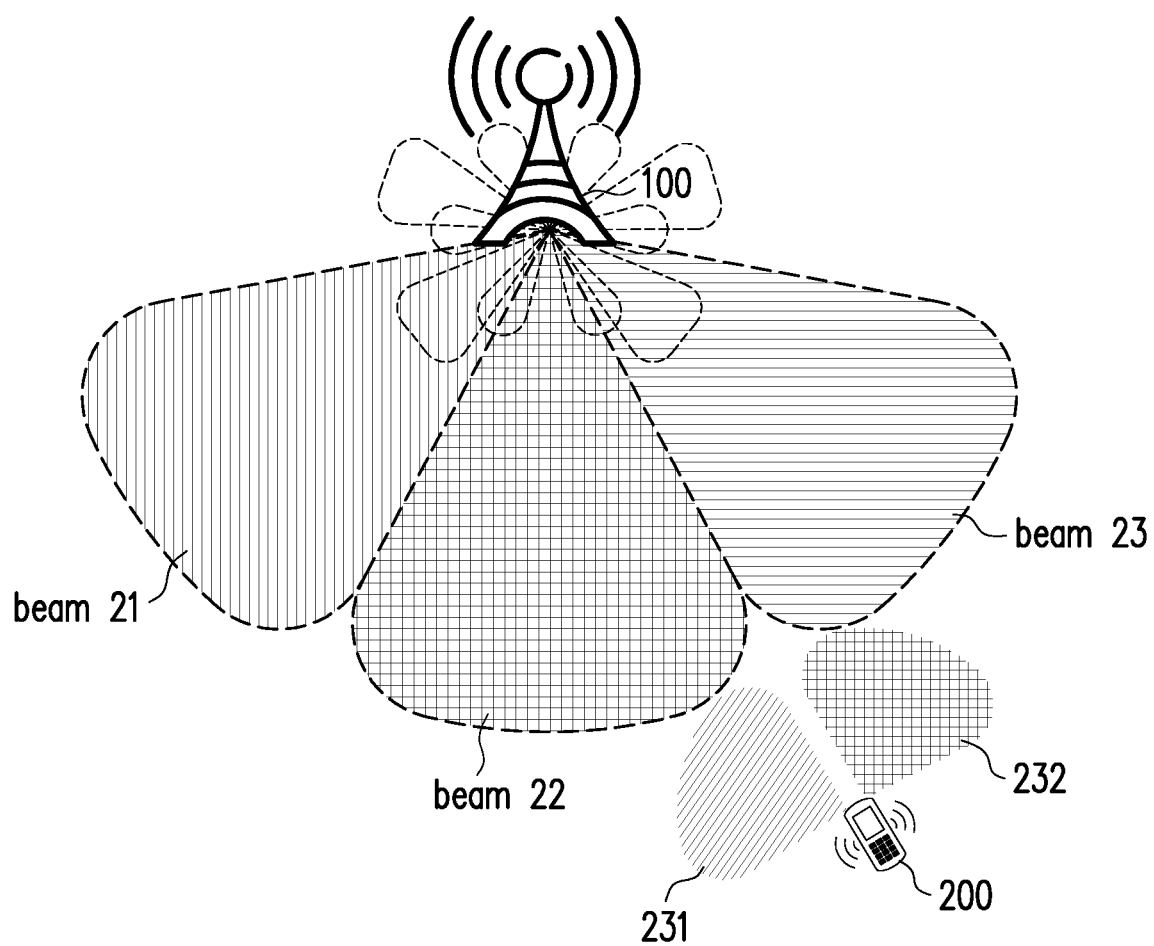
FIG. 2 is a schematic diagram of performing a DL reception through a spatial domain receive filter by UE according to an embodiment of the disclosure.

FIG. 2 is a schematic diagram of performing a DL reception through a spatial domain receive filter by UE 200 according to an embodiment of the disclosure, wherein the DL reception is performed in an unlicensed band. In FIG. 2, the BS 100 may support or not support a simultaneously transmission of multiple beams. For example, if the simultaneously transmission of multiple beams is supported by the BS 100, the BS 100 may occupy multiple channels respectively by the beam 21, 22, and 23 in the same time according to a successful listen before talk (LBT) result for each of the beams 21-23, wherein the LBT result is generated by an LBT procedure which should be performed before occupying a channel (e.g., a set of frequency and/or time domain resource) corresponding to the beams 21, 22, or 23. The LBT procedure may be a directional LBT procedure if beamforming technology could be adopted to the unlicensed band. An independent LBT procedure may be performed for each of the beams 21-23 by the BS 100. On the other hand, if the simultaneously transmission of multiple beams is not supported by the BS 100, the BS 100 would occupy the channels respectively corresponding to the beam 21, 22, and 23 in different time slots.

A serving area of the BS 100 could be divided into multiple divisions such as the beams 21-23, wherein each of beams 21-23 corresponding to a spatial domain reference signal. The spatial domain reference signal may be a signal such as a synchronization signal block (SSB), a channel state information reference signal (CSI-RS), or a sounding reference signal (SRS), wherein the SSB may comprise a primary synchronization signal (PSS), a second synchronization signal (SSS), or a physical broadcast channel (PBCH). If the UE 200 can determine which of the beams 21-23 should be used currently, UE 200 may perform DL reception through an appropriate spatial domain receive filter corresponding to the beam currently been used. For example, if a spatial domain reference signal is transmitted from the BS 100 to the UE 200 via the beam 22, the UE 200 would receive the spatial domain reference signal by using the spatial domain receive filter 231 instead of the spatial domain receive filter 232 since a spatial correlation between the spatial domain receive filter 231 and the beam 22 is higher than a spatial correlation between the spatial domain receive filter 232 and the beam 22. The quality of the spatial domain reference signal received by using the spatial domain receive filter 231 would be better than the quality of the spatial domain reference signal received by using the spatial domain receive filter 232.

Accordingly, if a channel or a data burst is correlated with the spatial domain reference signal corresponding to the beam 22 (e.g., the channel (or the data burst) and the spatial domain reference signal are spatial correlated or have the same spatial quasi co-location (QCL) assumption), the UE 200 may access said channel or data burst by using the same spatial domain receive filter (e.g., spatial domain receive filter 231) to achieve better quality of the DL reception, since the channel or data burst is served by the beam spatial correlated with the spatial domain reference signal.

In order to make the UE 200 receive the downlink signal from the BS 100 by using an appropriate spatial domain receive filter, the disclosure provides a method for the UE 200 to determine the appropriate spatial domain receive filter according to a spatial domain reference signal transmitted by the BS 100. Specifically, the UE 200 may receive an indication for indicating a channel is correlated (e.g., spatial quasi co-located) with a spatial domain reference signal transmitted by the BS 100, and the UE 200 may determine whether to access, according to the indication, the channel by using a spatial domain receive filter corresponding to the spatial domain reference signal, wherein the spatial domain reference signal may be, for example, a SSB, a CSI-RS, or a SRS. The indication may comprise, for example, an ID of the beam corresponding to the spatial domain reference signal or an ID of the spatial domain reference signal, but the disclosure is not limited thereto.

Figure 3:
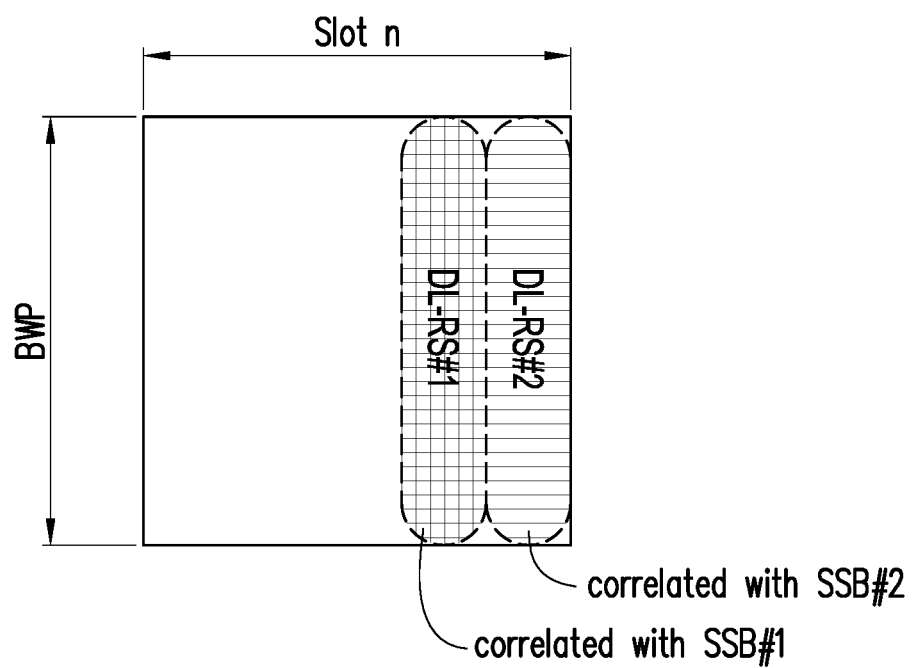
FIG. 3 is a schematic diagram of receiving a DL-RS by the UE according to an embodiment of the disclosure.

In an embodiment, the UE 200 may obtain, from a downlink reference signal (DL-RS), the indication for indicating whether a channel (or a data burst) correlated with a spatial domain reference signal is available. FIG. 3 is a schematic diagram of receiving a DL-RS by the UE according to an embodiment of the disclosure. The UE 200 may receive at least one DL-RS, such as DL-RS#1 (and/or DL-RS#2), wherein the DL-RS#1 (and/or DL-RS#2) may be, for example, a CSI-RS. In an embodiment, the DL-RS#1 is transmitted by a single antenna port of the BS 100. In FIG. 3, it is assumed that the DL-RS#1 is correlated with a spatial domain reference signal SSB#1 and the DL-RS#2 is correlated with a spatial domain reference signal SSB#2.

The DL-RS#1 (and/or DL-RS#2) may be allocated within a bandwidth part (BWP) pre-configured to the UE 200 as illustrated in FIG. 3 or be allocated within a pre-determined bandwidth, wherein one BWP comprises a plurality of consecutive PRBs. Therefore, the UE 200 may perform a DL reception corresponding to the DL-RS#1 (and/or DL-RS#2) on the BWP pre-configured to the UE 200. For example, the bandwidth of the DL-RS#1 may be same as (or smaller than) the BWP pre-configured to the UE 200 or the bandwidth of the DL-RS#1 may be above 80 percentage of 20 MHz. In an embodiment, the BWP may be a bandwidth of the BS 100 which serves the UE 200. The UE 200 may obtain information related to the bandwidth of the DL-RS#1 by receiving a higher layer signaling (e.g., a medium access control (MAC) layer signaling or a radio resource control (RRC) layer signaling) from the BS 100. Spatial correlation information among signals may be configured by the higher layer signaling. For example, a higher layer signaling transmitted from the BS 100 may indicate to the UE 200 that signals such as DL-RS, SSB, CSI-RS, or SRS are quasi co-located with each other. If the UE 200 knows that a DL-RS is quasi co-located with a spatial domain reference signal (e.g., a SSB), the UE 200 may determine, in response to receiving the DL-RS, a channel quasi co-located with the spatial domain reference signal has been occupied for the UE 200.

Figure 4B:
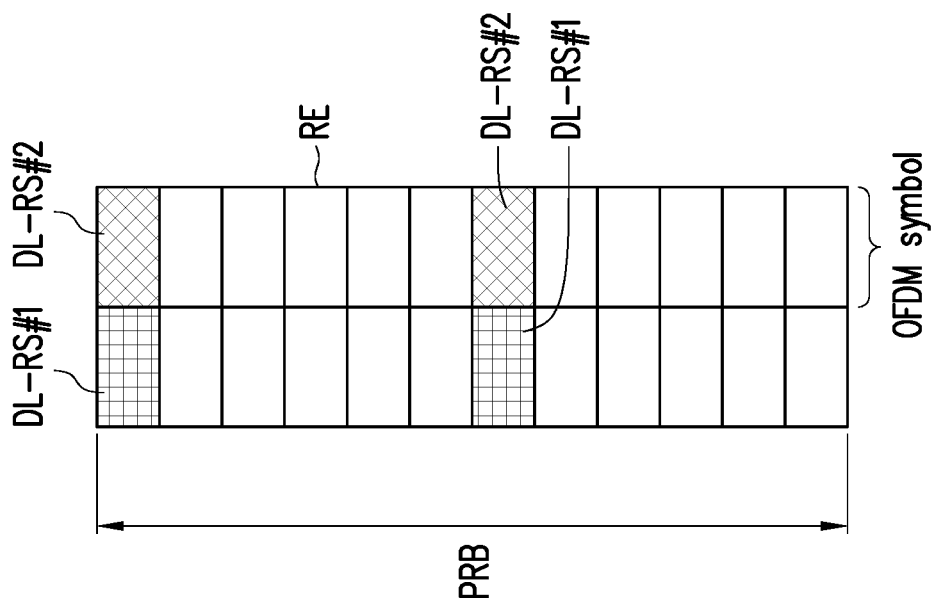
FIGS. 4A and 4B are schematic diagrams of the physical resource block (PRB) carrying the DL-RS according to an embodiment of the disclosure.
Figure 4A:
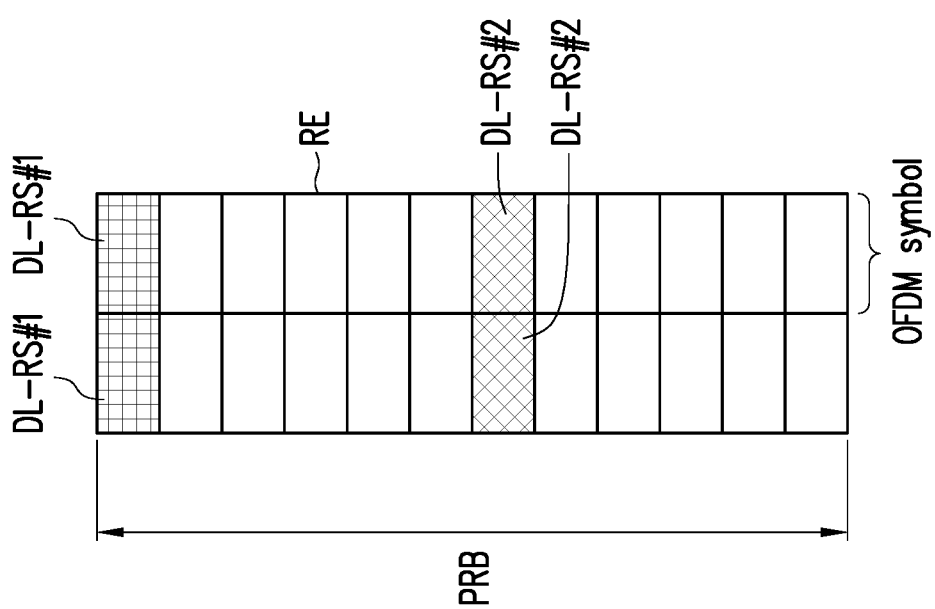

In an embodiment, the DL-RS associated with the indication is carried by multiple resource elements (RS). FIGS. 4A and 4B are schematic diagrams of the PRB carrying the DL-RS according to an embodiment of the disclosure. Multiple DL-RSs may be transmitted in time-division multiplexing (TDM), frequency-division multiplexing (FDM), and/or code-division multiplexing (CDM) manner.

The DL-RS#1 (and/or DL-RS#2) may provide the indication to the UE 200 in an implicit manner. For example, the UE 200 may determine that a channel provided by the BS 100 (e.g., the channel occupied by the BS 100) for the UE 200 is correlated with the DL-RS#1 in response to receiving the DL-RS#1 by using the spatial domain receive filter 231 corresponding to the DL-RS#1, wherein if a received power or a received quality of the DL-RS#1 received by the spatial domain receive filter 231 is exceeded a pre-determined threshold, the UE 200 may determine that the spatial domain receive filter 231 is corresponded to the DL-RS#1.

Figure 5A:
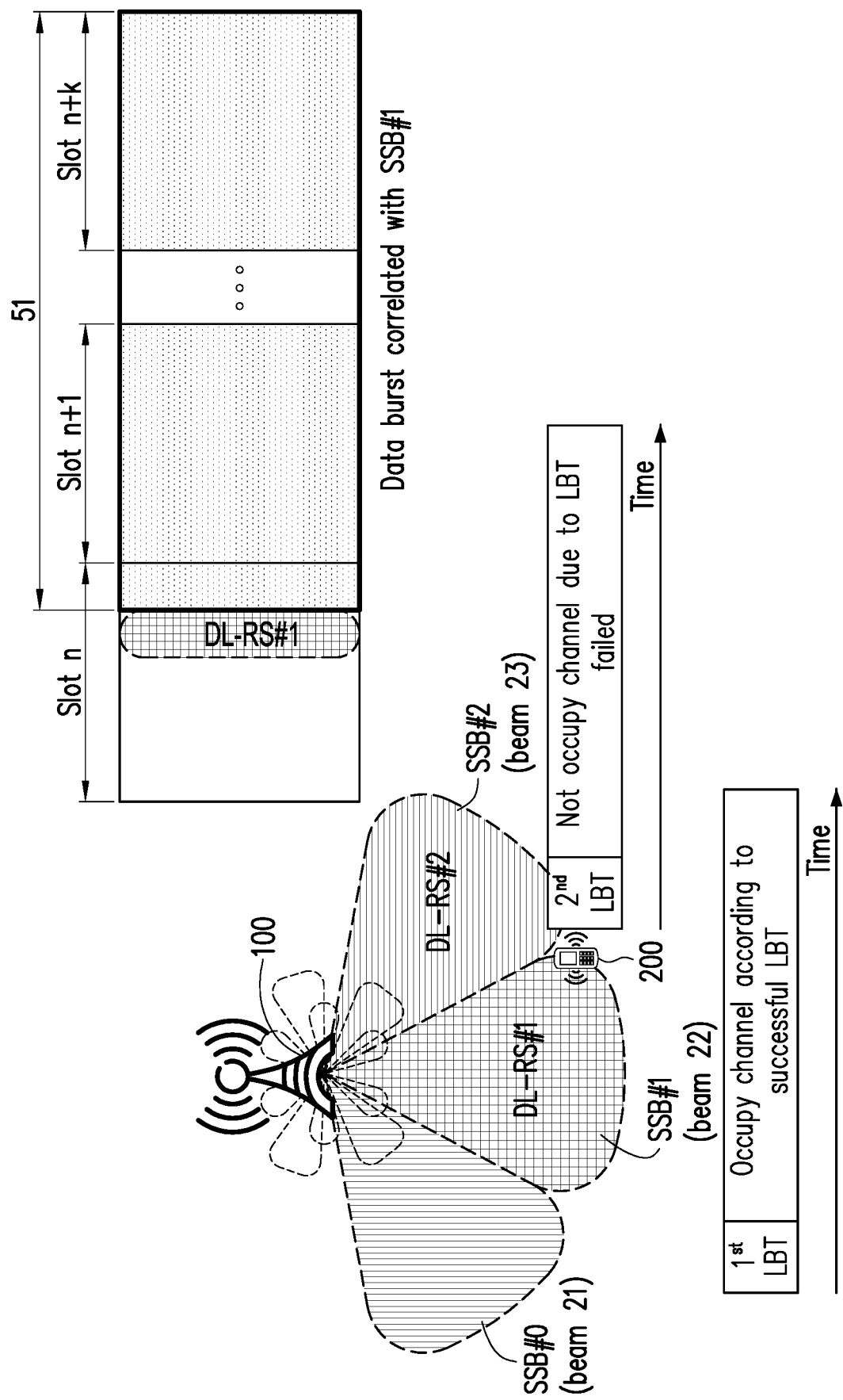
FIG. 5A is a schematic diagram of an occupied channel correlated with the DL-RS according to an embodiment of the disclosure.

FIG. 5A is a schematic diagram of an occupied channel correlated with the DL-RS#1 according to an embodiment of the disclosure. Referring to FIG. 5A, spatial domain reference signals SSB#0, SSB#1, and SSB#2 have been transmitted through the beam 21, 22, and 23 by the BS 100 respectively. The BS 100 would complete an LBT procedure before transmitting a DL-RS through the beams 22 or 23. It is assumed that an LBT procedure corresponding to the beam 22 is successful and an LBT procedure corresponding to the beam 23 is failed. That is, the BS 100 may transmit the DL-RS#1 through the beam 22 but cannot transmit the DL-RS#2 through the beam 23 according to the LBT results.

The UE 200 may obtain an indication, such as the DL-RS#1, for indicating whether a data burst (or a channel) correlated (e.g., spatial quasi co-located) with the SSB#1 is available. The DL-RS#1 indicates that a data burst correlated with the SSB#1 is available to the UE 200, wherein the data burst is provided by the BS 100 for the UE 200. The UE 200 may access a channel during an occupancy time 51 if the DL-RS#1 indicates that the channel is available, wherein any of a DL signal and/or channel (e.g., PDCCH, PDSCH, and/or CSI-RS) carried by the data burst during the occupancy time 51 would be correlated (e.g., spatial correlated or spatial quasi co-located) with the SSB#1.

Since an SSB#1 may have been received by the UE 200, the UE 200 may select an appropriate spatial domain receive filter corresponding to the SSB#1 so as to access the data burst correlated with the SSB#1. For example, the UE 200 may access the data burst spatial quasi co-located with the SSB#1 by using the spatial domain receive filter 231 as illustrated in FIG. 2. The quality or power of a DL signal received by the spatial domain receive filter 231 during the occupancy time 51 would be good since the spatial domain receive filter 231 is spatial correlated with the beam 22.

In an embodiment, the indication for indicating whether a data burst (or a channel) correlated with the SSB#1 is available may be transmitted by the BS 100 repeatedly during the occupancy time 51. Each transmission of the indication may be implemented by a DL-RS or downlink control information (DCI) transmitted by the BS 100 during the occupancy time 51. That is, an indication may be transmitted before the occupancy time 51 or during any of the DL slots within the occupancy time 51.

Figure 5B:
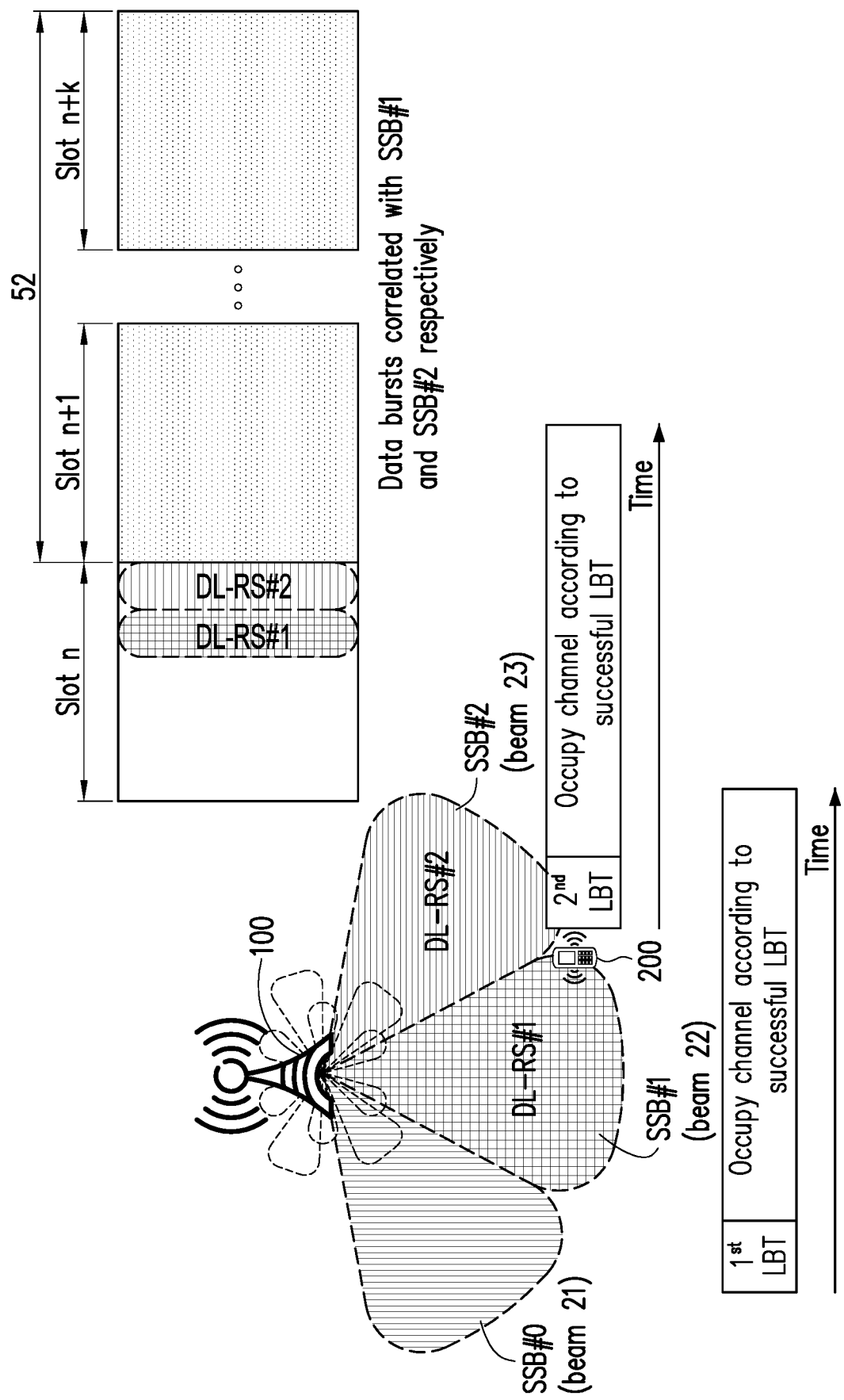
FIG. 5B is a schematic diagram of occupied channels respectively correlated with the DL-RSs according to an embodiment of the disclosure.

FIG. 5B is a schematic diagram of occupied channels respectively correlated with the DL-RS#1 and DL-RS#2 according to an embodiment of the disclosure. Referring to FIG. 5B, spatial domain reference signals SSB#0, SSB#1, and SSB#2 are transmitted through the beam 21, 22, and 23 by the BS 100 respectively. The BS 100 would complete an LBT procedure before transmitting a DL-RS through the beam 22, or 23. It is assumed that LBT procedures respectively corresponding to the beam 22 and beam 23 are successful. That is, the BS 100 may transmit the DL-RS#1 through the beam 22 and may transmit the DL-RS#2 through the beam 23 according to the LBT results.

The UE 200 may obtain an indication for indicating whether a data burst (or a channel) correlated with the SSB#1 is available in response to receiving the DL-RS#1 and obtain an indication for indicating whether a data burst (or a channel) correlated with the SSB#2 is available in response to receiving the DL-RS#2, wherein the DL-RS#1 indicates that the data burst correlated (e.g., spatial correlated or spatial quasi co-located) with the SSB#1 is available to the UE 200, the DL-RS#2 indicates that the data burst correlated (e.g., spatial correlated or spatial quasi co-located) with the SSB#2 is available to the UE 200, and the data bursts respectively corresponding to the SSB#1 and the SSB#2 are occupied by the BS 100 for the UE 200. The UE 200 may access a channel within an occupancy time 52. Any of a DL signal and/or channel (e.g., PDCCH, PDSCH, and/or CSI-RS) carried by the data burst correlated with the SSB#1 during the occupancy time 52 would be, for example, spatial quasi co-located with the SSB#1, and any of a DL signal and/or channel (e.g., PDCCH, PDSCH, and/or CSI-RS) carried by the data burst correlated with the SSB#2 during the occupancy time 52 would be, for example, spatial correlated (or spatial quasi co-located) with the SSB#2. It should be noted that the data bursts respectively spatial correlated with the SSB#1 and the SSB#2 may be time-division multiplexed, frequency-division multiplexed, spatial-division multiplexed and/or code-division multiplexed with each other, the disclosure is not limited thereto.

Since an SSB#1 and an SSB#2 may have been received by the UE 200, the UE 200 may select an appropriate spatial domain receive filter corresponding to the SSB#1 so as to access the data burst correlated (e.g., spatial quasi co-located) with the SSB#1, and select an appropriate spatial domain receive filter corresponding to the SSB#2 so as to access the data burst correlated (e.g., spatial quasi co-located) with the SSB#2. For example, the UE 200 may access the data burst spatial quasi co-located with the SSB#1 by using the spatial domain receive filter 231 as illustrated in FIG. 2, and the UE 200 may access the data burst spatial quasi co-located with the SSB#2 by using the spatial domain receive filter 232 as illustrated in FIG. 2. The quality or power of a DL signal received by the spatial domain receive filter 231 during the occupancy time 52 would be good since the spatial domain receive filter 231 is spatial correlated with the beam 22, and the quality or power of a DL signal received by the spatial domain receive filter 232 during the occupancy time 52 would be good since the spatial domain receive filter 232 is spatial correlated with the beam 23.

Figure 6:
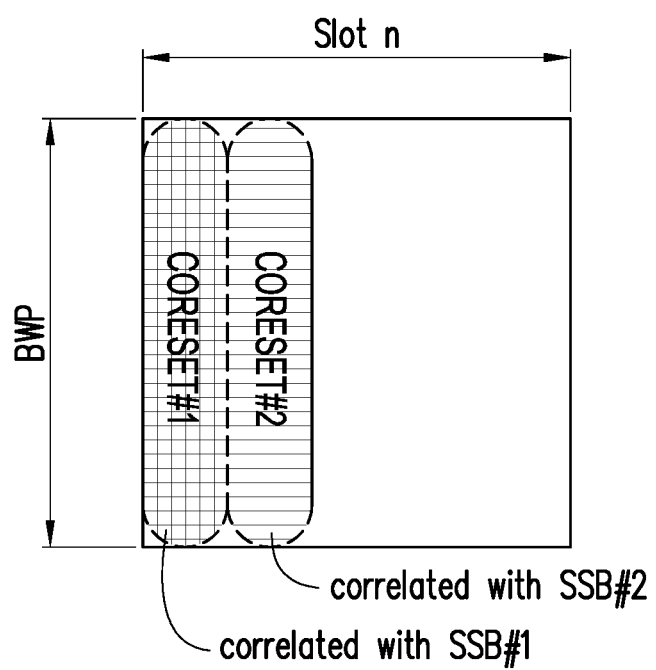
FIG. 6 is a schematic diagram of receiving a control resource set by the UE according to an embodiment of the disclosure.

In an embodiment, the UE 200 may obtain the indication for indicating whether a channel (or a data burst) correlated (e.g., spatial correlated or spatial quasi co-located) with a spatial domain reference signal is available from a DCI, wherein the UE 200 obtains the DCI by detecting a control resource set (CORESET) which includes the DCI, and the CORESET configured to the UE 200 may be spatial correlated with a spatial domain reference signal which has been received by the UE 200. FIG. 6 is a schematic diagram of receiving the CORESET by the UE according to an embodiment of the disclosure. The UE 200 may receive at least one CORESET such as CORESET#1 and/or CORESET#2. It is assumed that the CORESET#1 is spatial quasi co-located with the SSB#1 and the CORESET#2 is spatial quasi co-located with the SSB#2 (as illustrated in FIG. 7B), wherein the UE 200 can obtain the spatial correlation information between the CORESET#1 and the SSB#1 (or between the CORESET#2 and the SSB#2) from a higher layer signaling transmitted by the BS 100. Therefore, the UE 200 may receive the CORESET#1 by using the spatial domain receive filter 231 corresponding to the SSB#1, and receive the CORESET#2 by using the spatial domain receive filter 232 corresponding to the SSB#2. It should be noted that the DCIs carried by different CORESETs (e.g., respectively spatial correlated with different spatial domain reference signals) may refer to the same or different information. In an embodiment, the UE 200 may obtain the CORESET#1 by receiving a demodulated reference signal (DMRS), wherein the DMRS is spatial quasi co-located with the SSB#1. Similarly, the UE 200 may obtain the CORESET#2 by receiving a DMRS, wherein the DMRS is spatial quasi co-located with the SSB#2.

Referring back to FIG. 6, the CORESET#1 (or DCI carried by the CORESET#1) is associated with a search space which is to be monitored by the UE 200. The UE 200 may detect the CORESET#1 associated with the search space to obtain the DCI by using the spatial domain receive filter (i.e., spatial domain receive filter 231 as illustrated in FIG. 2) corresponding to the SSB#1, wherein the search space may comprise a set of search candidate for receiving the DCI and/or may correspond to at least one control resource set ID (i.e., ID of COREST#1).

The CORESET#1 (and/or CORESET#2) may be allocated within a BWP pre-configured to the UE 200. The CORESET#1 (and/or CORESET#2) may provide the indication to the UE 200 in an explicit manner. Specifically, the DCI transmitted by the CORESET#1 may include a data bit, wherein the data bit may indicate whether a channel (or a data burst) spatial quasi co-located with the SSB#1 is existed or available. Thus, the UE 200 may access the channel (or the data burst) by using the spatial domain receive filter 231 corresponding to the SSB#1, wherein the step of accessing the channel may include receiving a command or data from a PDCCH and/or PDSCH, and/or performing measurement by using the resource of the channel.

For example, the DCI may include a N-bit message, wherein N is configured as 2 by the BS 100 in this embodiment. The first bit of the 2-bit message corresponding to the channel spatial quasi co-located with the SSB#1, and the second bit of the 2-bit message corresponding to the channel spatial quasi co-located with the SSB#2. If the first bit is 1 and the second bit is 0 (i.e., 2-bit message=[1, 0]), the UE 200 may determine that a channel (or a data burst) spatial quasi co-located with the SSB#1 is available to the UE 200 (e.g., SSB#1 has been occupied by the BS 100 for the UE 200) and a channel spatial quasi co-located with the SSB#2 and available to the UE 200 is not existed. Similarly, if the first bit is 0 and the second bit is 1 (i.e., 2-bit message=[0, 1]), the UE 200 may determine that a channel spatial quasi co-located with the SSB#1 and available to the UE 200 is not existed and a channel spatial quasi co-located with the SSB#2 is available to the UE 200 (e.g., SSB#2 has been occupied by the BS 100 for the UE 200). If both of the first bit and the second bit are 1 (i.e., 2-bit message=[1, 1]), the UE 200 may determine that channels respectively spatial quasi co-located with the SSB#1 and the SSB#2 are available to the UE 200. In that case, the UE 200 may determine a channel quasi co-located with the SSB#2 available to the UE 200 do exist even if any of signal quasi co-located with the SSB#2 has not been received by (or configured to) the UE 200. It should be noted that the DCI may be configured with limited search candidate (e.g., 1 or 2).

The CORESET#1 (and/or CORESET#2) can provide the indication to the UE 200 in an implicit manner. For example, the indication can be included in the DCI transmitted by the CORESET#1. The UE 200 can determine that a channel occupied by the BS 100 for the UE 200 is spatial quasi co-located with the SSB#1 in response to receiving the CORESET#1 by using the spatial domain receive filter 231 corresponding to the SSB#1 In an embodiment, the UE 200 may stop performing blind detection for a DCI transmitted by the CORESET#2 in response to detecting the DCI transmitted by the CORESET#1.

Figure 7A:
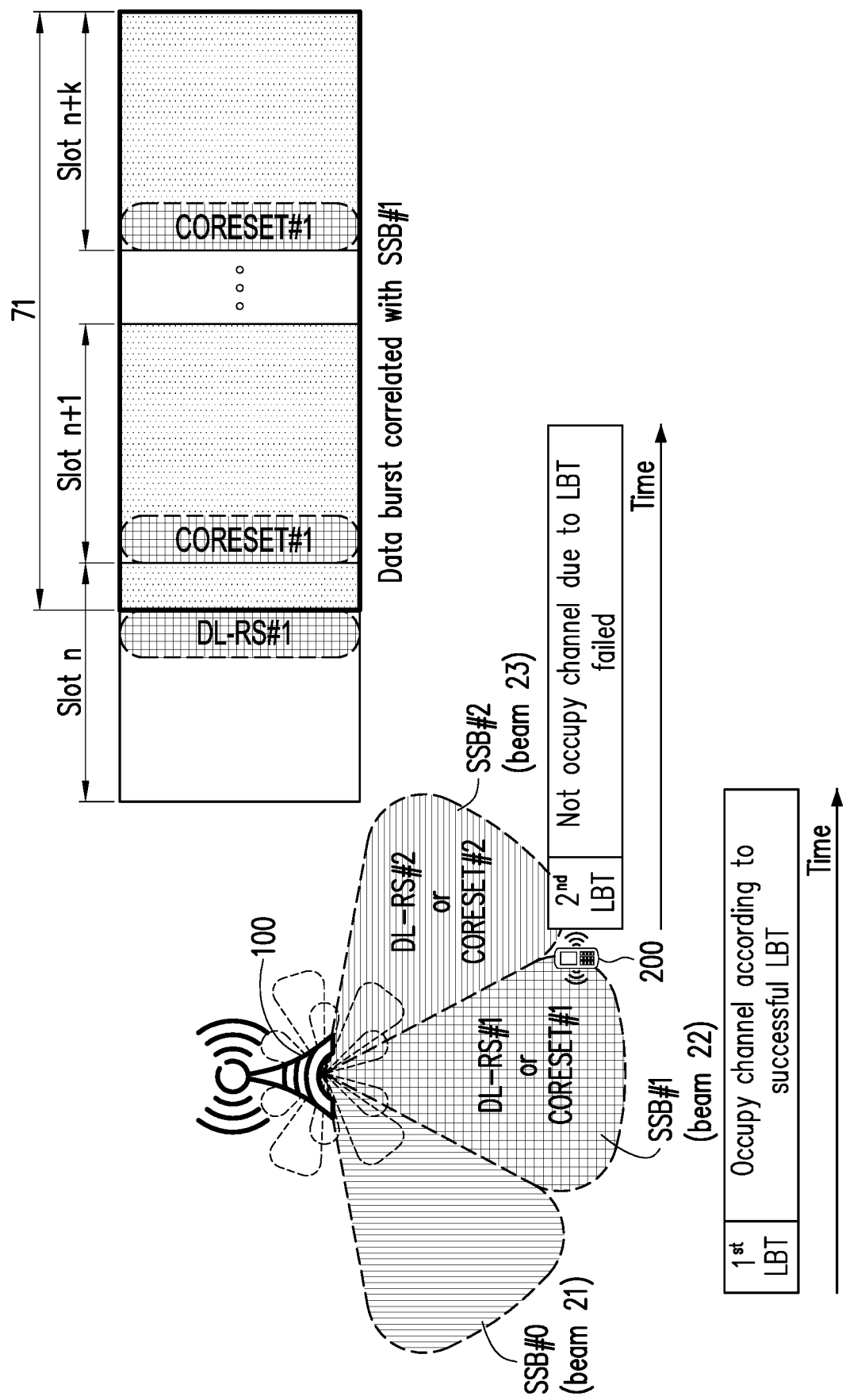
FIG. 7A is a schematic diagram of an occupied channel correlated with a spatial domain reference signal according to an embodiment of the disclosure.
Figure 7B:
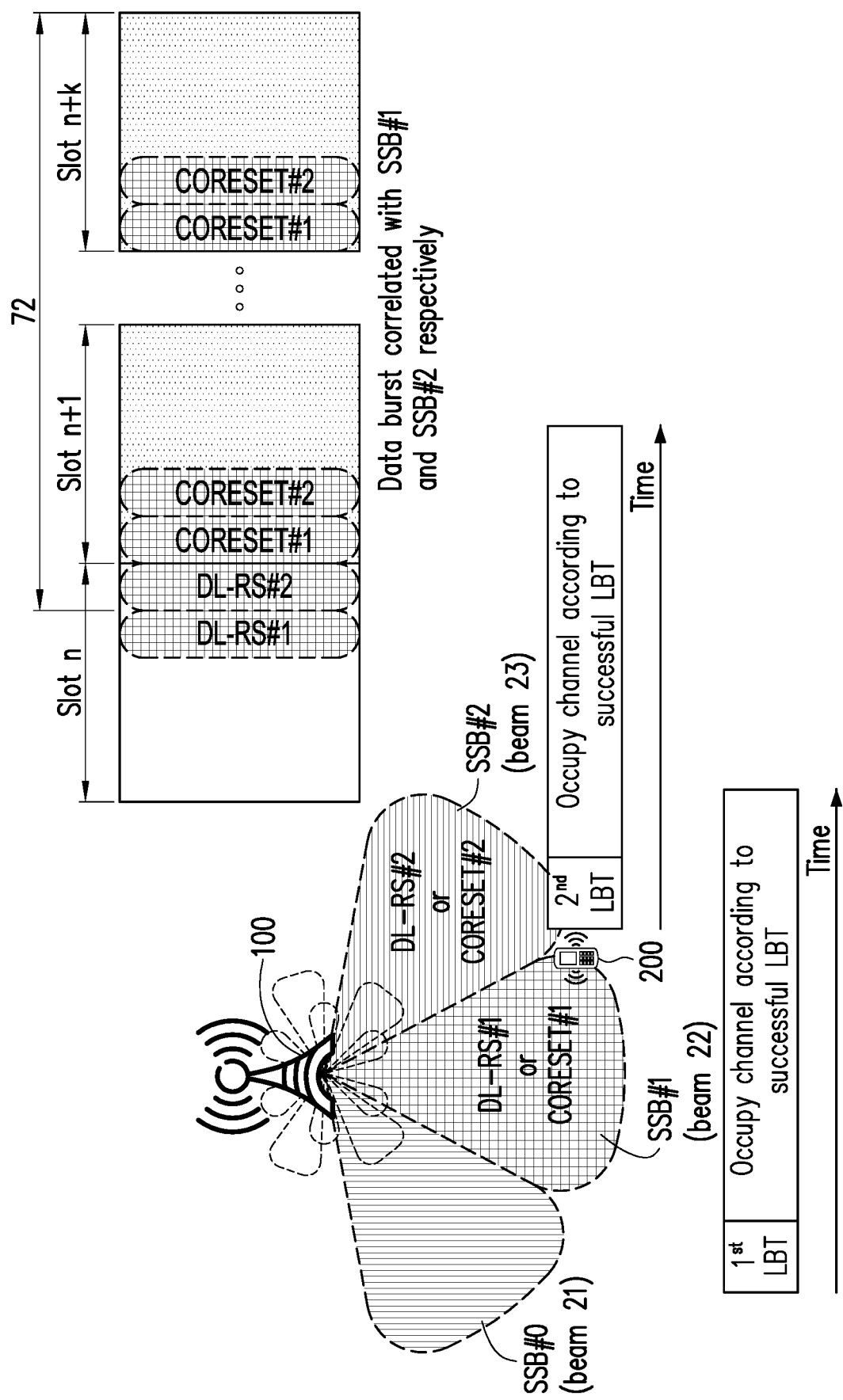
FIG. 7B is a schematic diagram of occupied channels respectively correlated with the spatial domain reference signals according to an embodiment of the disclosure.

FIG. 7A is a schematic diagram of an occupied channel correlated with a spatial domain reference signal SSB#1 according to an embodiment of the disclosure. Referring to FIG. 7A, spatial domain reference signals SSB#0, SSB#1, and SSB#2 are transmitted through the beam 21, 22, and 23 of the BS 100 respectively. The BS 100 would complete an LBT procedure before transmitting a CORESET through the beam 22 or beam 23. It is assumed that an LBT procedure corresponding to the beam 22 is successful and an LBT procedure corresponding to the beam 23 is failed. That is, the BS 100 may transmit the CORESET#1 through the beam 22 but cannot transmit the CORESET#2 through the beam 23 according to the LBT results.

The UE 200 detects and receives the CORESET#1. In an embodiment, a search space of the CORESET#1 is pre-configured to the UE 200, so the UE 200 may detect the CORESET#1 according to the pre-configured search space. In another embodiment, the UE 200 may perform blind detection for receiving the CORESET#1. In the other embodiment, the UE 200 may detect the CORESET#1 according to a DL-RS. For example, if the BS 100 completes an LBT procedure for a data burst quasi co-located with the SSB#1, the BS 100 may transmit a DL-RS#1 via a channel quasi co-located with the SSB#1 before transmitting the COERSET#1 during time slot n. The UE 200 may receive the DL-RS#1 before the CORESET#1 is transmitted by the BS 100 (i.e., before the start of the time slot n+1), and the UE 200 may select the spatial domain receive filter 231 corresponding to the DL-RS#1 to receive the CORESET#1 in response to receiving the DL-RS#1.

The UE 200 may obtain an indication for indicating whether a data burst (or a channel) correlated with the SSB#1 is available in response to receiving the DCI of the CORESET#1. The indication comprised in the DCI indicates that a data burst spatial correlated (e.g., spatial quasi co-located) with the SSB#1 is available to the UE 200, wherein the data burst is occupied by the BS 100 for the UE 200. The UE 200 may access a channel during an occupancy time 71 if the DCI indicates that the data burst is available, wherein any of the DL signals and/or channels (e.g., PDCCH, PDSCH, and/or CSI-RS) transmitted via the data burst during the occupancy time 71 are correlated (e.g., spatial correlated or spatial quasi co-located) with the SSB#1. It should be noted that the DCI may further comprise at least one of the following information: the number of time slots within the data burst; the number of time slots comprising an uplink resource within the data burst; the number of time slots comprising a downlink resource within the data burst; the number of uplink symbols in the at least one time slot within the data burst; and the number of downlink symbols in the at least one time slot within the data burst.

In an embodiment, the indication for indicating whether a data burst (or a channel) correlated with the SSB#1 is available may be transmitted by the BS 100 repeatedly during the occupancy time 71. Each transmission of the indication may be implemented by DCI transmitted by the BS 100 during the occupancy time 71. That is, an indication may be transmitted before the occupancy time 71 or during any of the DL slots within the occupancy time 71.

FIG. 7B is a schematic diagram of occupied channels respectively correlated with the spatial domain reference signals SSB#1 and SSB#2 according to an embodiment of the disclosure. Referring to FIG. 7B, spatial domain reference signals SSB#0, SSB#1, and SSB#2 are transmitted through the beam 21, 22, and 23 of the BS 100 respectively. The BS 100 would complete an LBT procedure before transmitting a data burst (e.g., comprising CORESET, PDSCH and/or CSI-RS but not limited) through the beam 22 or beam 23. It is assumed that LBT procedures respectively corresponding to the beam 22 and beam 23 are successful. That is, the BS 100 may transmit the CORESET#1 through the beam 22 and may transmit the CORESET#2 through the beam 23 according to the LBT results.

The UE 200 may obtain an indication for indicating whether a data burst (or a channel) correlated (e.g., spatial correlated or spatial quasi co-located) with the SSB#1 is available in response to receiving a DCI from the CORE-SET#1 and obtain an indication for indicating whether a data burst (or a channel) correlated (e.g., spatial correlated or spatial quasi co-located) with the SSB#2 is available in response to receiving a DCI of the CORESET#2, wherein the DCI of the CORESET#1 indicates that the data burst spatial quasi co-located with the SSB#1 is available to the UE 200, the DCI of the CORESET#2 indicates that the data burst spatial quasi co-located with the SSB#2 is available to the UE 200, and the data bursts are occupied by the BS 100 for the UE 200. The UE 200 may access a channel within an occupancy time 72. Therefore, any of DL signals and/or channels (e.g., PDCCH, PDSCH, and/or CSI-RS) transmitted via the data bursts during the occupancy time 72 may be spatial quasi co-located with the one of the SSB#1 and SSB#2. It should be noted that the data bursts respectively spatial quasi co-located with the SSB#1 and the SSB#2 may be time-division multiplexed, frequency-division multiplexed, spatial-division multiplexed, and/or code-division multiplexed with each other, the disclosure is not limited thereto.

Since an SSB#1 and an SSB#2 may have been received by (or configured to) the UE 200, the UE 200 may select an appropriate spatial domain receive filter corresponding to the SSB#1 so as to access the data burst spatial quasi co-located with the SSB#1, or may select an appropriate spatial domain receive filter corresponding to the SSB#2 so as to access the data burst (or the channel) spatial quasi co-located with the SSB#2. For example, the UE 200 may access the data burst (or the channel) spatial quasi co-located with the SSB#1 by using the spatial domain receive filter 231 as illustrated in FIG. 2, and the UE 200 may access the data burst spatial quasi co-located with the SSB#2 by using the spatial domain receive filter 232 as illustrated in FIG. 2.

Figure 8:
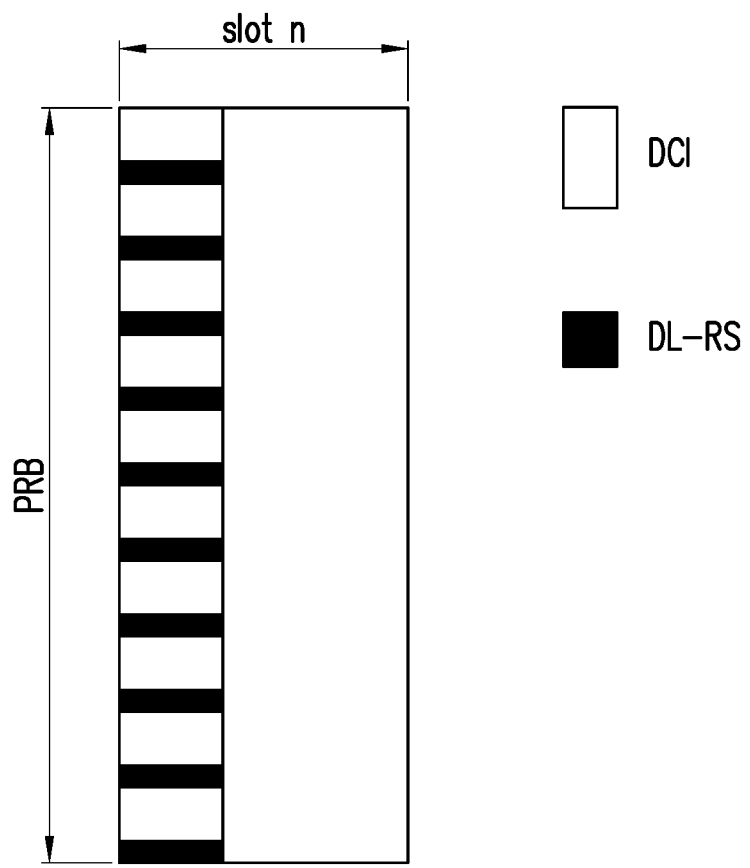
FIG. 8 is a schematic diagram of the PRB carrying the DCI according to an embodiment of the disclosure.

In an embodiment, the DCI associated with the indication is carried by multiple resource elements. FIG. 8 is a schematic diagram of the PRB carrying the DCI according to an embodiment of the disclosure, wherein the DL-RSs shown on the FIG. 8 may be DMRS which are used for demodulation of the DCI. The UE 200 may obtain the indication by decoding or demodulating the DCI according to the DM-RSs.

Figure 9A:
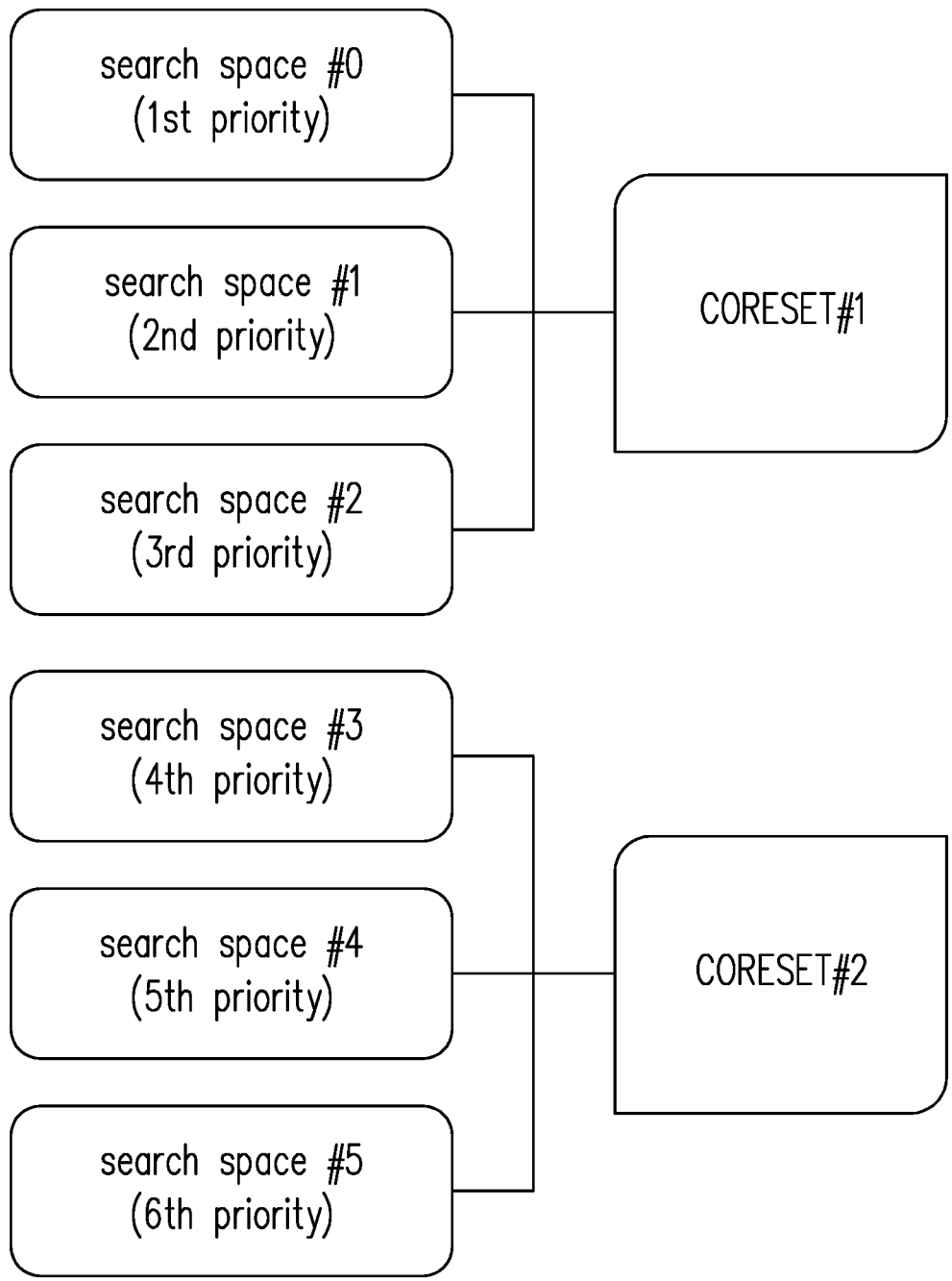
FIG. 9A is a schematic diagram of search space corresponding to a CORESET according to an embodiment of the disclosure.

FIG. 9A is a schematic diagram of search space corresponding to a CORESET according to an embodiment of the disclosure. Referring to FIGS. 7B and 9A, the CORESET#1 (or DCI carried by the CORESET#1) is associated with at least one search space such as search space #0, search space #1, and search space #2 which are configured to be monitored by the UE 200, wherein each of the search spaces is for detecting a DCI corresponding to the data burst correlated (e.g., spatial correlated or spatial quasi co-located) with the SSB#1. The CORESET#2 (or DCI carried by the CORESET#2) is associated with at least one search space such as search space #3, search space #4, and search space #5 which are configured to be monitored by the UE 200, wherein each of the search spaces is for detecting a DCI corresponding to the data burst correlated (e.g., spatial correlated or spatial quasi co-located) with the SSB#2. An indication (e.g., DCI) received by the UE 200 may indicate whether a search space (or a CORESET corresponding to the search space) is available. The priorities of multiple search spaces for detecting the DCIs may be determined by the UE 200, wherein a first search space of the multiple search spaces has higher priority than a second search space of the multiple search spaces if the first search space is available and the second search space is not available, and the search space is determined to be available if the indication indicates the corresponding spatial domain reference signal is available. Specifically, the UE 200 may determine the priorities of the multiple search spaces from small index to large index, and the UE 200 may detect the multiple search spaces according to the priorities, wherein each of the search spaces is associated with a channel available to the UE 200. For example, the search space #0 with the smallest index would be the first search space to be detected by the UE 200, and the search space #5 with the largest index would be the last search space to be detected by the UE 200. It should be noted that the number of search spaces associated with the CORESET#1 or CORESET#2 can be any positive integer. It should be noted that an ID of a search space may be configured to the UE 200 by the BS 100.

In an embodiment, a search space or a CORESET corresponding to the search space is determined to be available according to a DL-RS. For example, the search space#0, search space#1, and search space#2 and/or the CORESET#1 may be determined to be available to the UE 200 if the BS 100 occupies, via the DL-RS#1, the data burst correlated with the SSB#1 for the occupancy time 72, as illustrated in FIG. 7B.

In an embodiment, a search space or a CORESET corresponding to the search space is determined to be available according to an availability of a spatial domain reference signal corresponding to the search space. For example, the search space#0, search space#1, and search space#2 and/or the CORESET#1 may be determined to be available to the UE 200 if a data burst correlated (e.g., spatial correlated or spatial quasi co-located) with the SSB#1 is available to the UE 200 (e.g., the SSB#1 is detected by the UE 200), as illustrated in FIG. 7B.

In an embodiment, the BS 100 does not support a simultaneously transmission of multi beams, or an LBT procedure of one of the SSB#1 and SSB#2 has failed. That is, the data burst correlated (e.g., spatial correlated or spatial quasi co-located) with the SSB#1 and the data burst correlated (e.g., spatial correlated or spatial quasi co-located) with the SSB#2 would not exist in the same time. Accordingly, the search spaces available to the UE 200, such as search spaces #0-#5, would be limited to search spaces #0-#2 in response to receiving an indication that indicates a data burst correlated (e.g., spatial correlated or spatial quasi co-located) with the SSB#1 by the UE 200. By contrast, the search spaces available to the UE 200, such as search spaces #0-#5, would be limited to search spaces #3-#5 in response to receiving correlated (e.g., spatial correlated or spatial quasi co-located) with the SSB#2 by the UE 200. Therefore, the UE 200 does not need to monitor the search spaces of the data burst correlated (e.g., spatial correlated or spatial quasi co-located) with the SSB#2 when receiving the data burst correlated (e.g., spatial correlated or spatial quasi co-located) with the SSB#1, and vice versa.

Figure 7C:
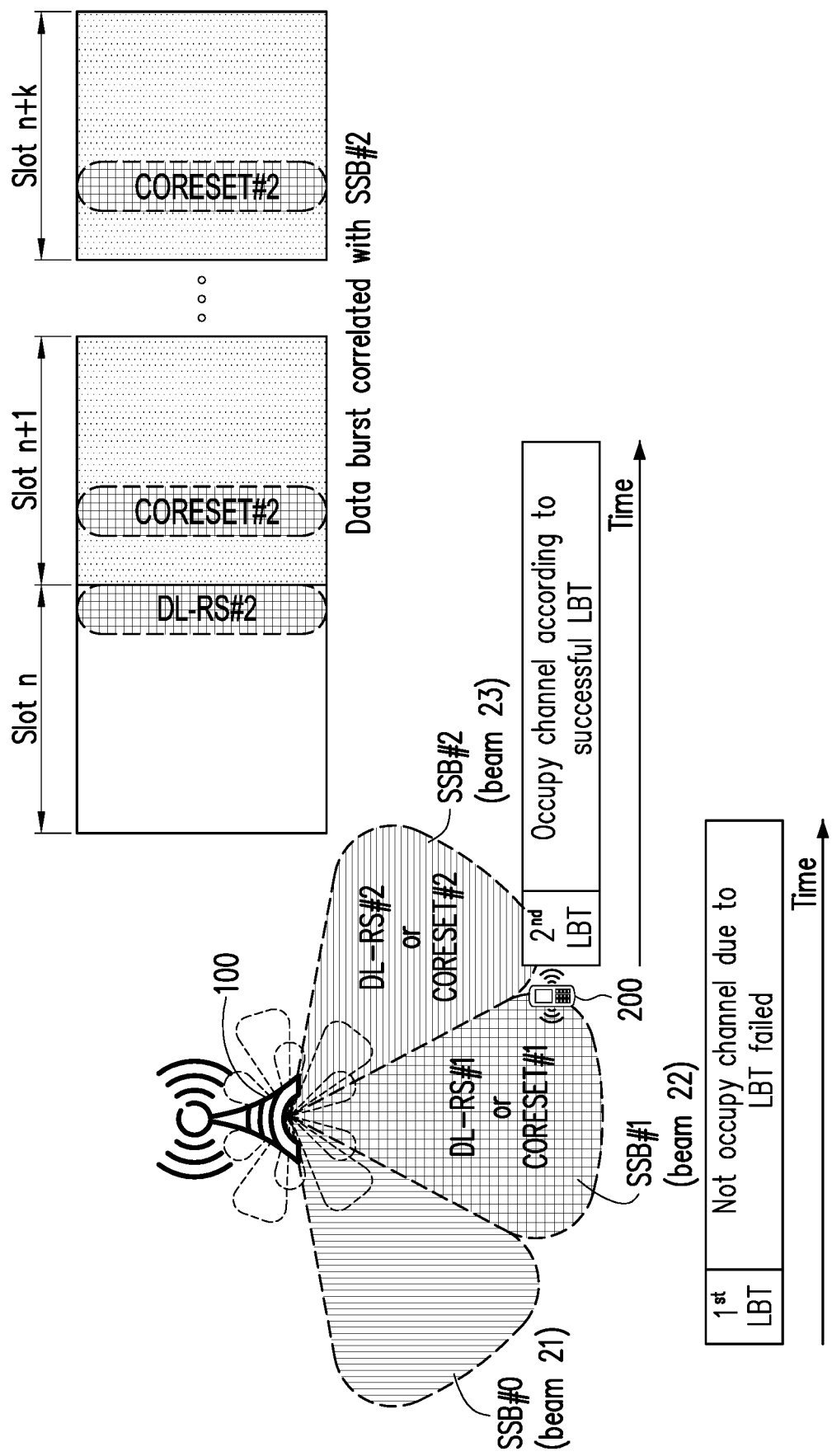
FIG. 7C is a schematic diagram of an occupied channel correlated with a spatial domain reference signal according to an embodiment of the disclosure.
Figure 9B:
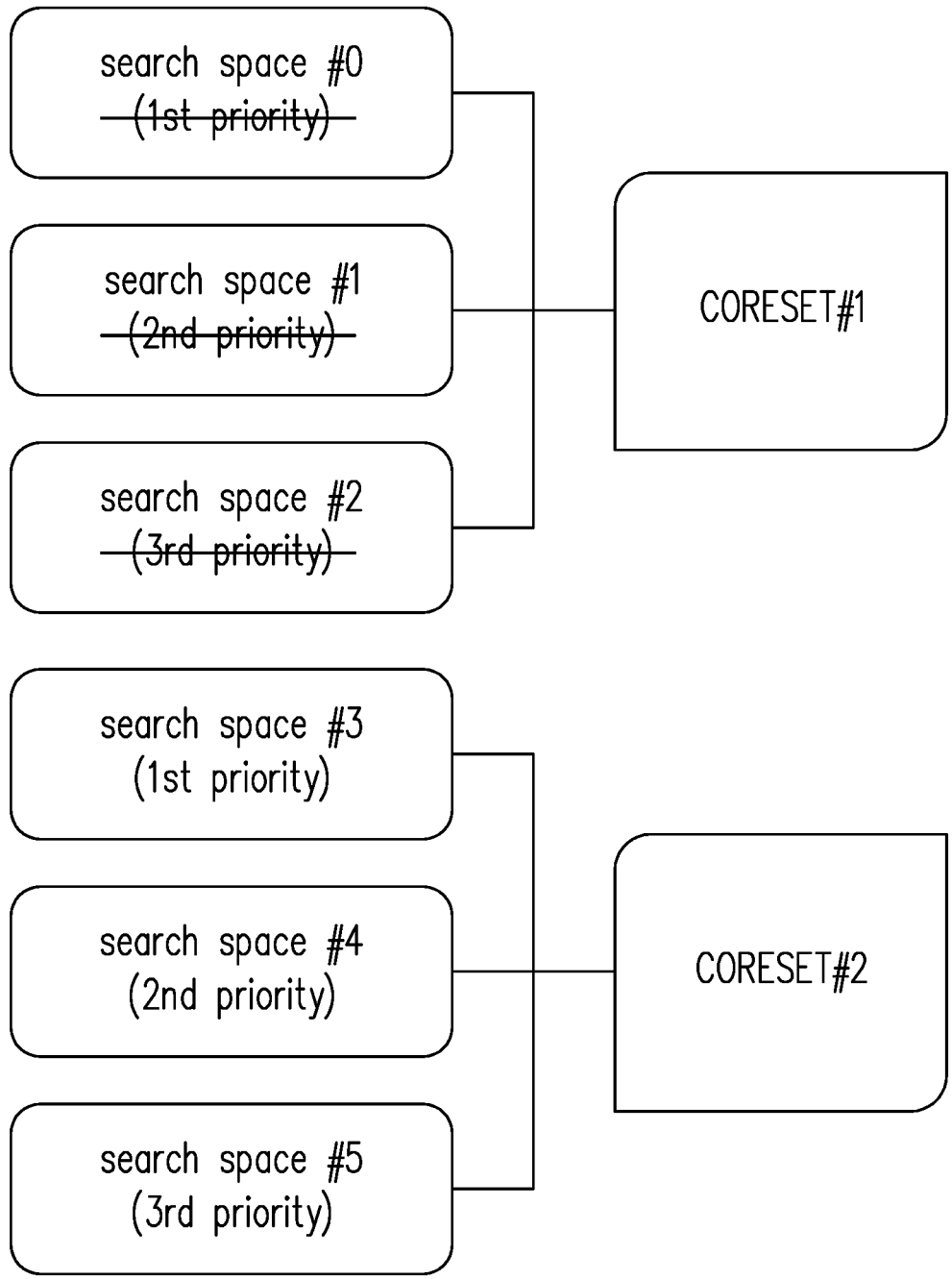
FIG. 9B is a schematic diagram of search space corresponding to a CORESET according to another embodiment of the disclosure.

In an embodiment, the UE 200 may determine whether a search space or a CORESET is available to the UE 200 according to the indication received from the BS 200. FIG. 7C is a schematic diagram of an occupied channel correlated with a spatial domain reference signal SSB#2 according to an embodiment of the disclosure. FIG. 9B is a schematic diagram of search space corresponding to a CORESET according to another embodiment of the disclosure. Referring to FIGS. 7C and 9B, it is assumed that the UE 200 would not monitor the search spaces of CORESET#1 due to, for example, an LBT procedure for a data burst comprising CORESET#1 has failed (i.e., the BS 100 would not transmit the CORESET#1) or due to receiving, from the BS 100, an indication (e.g., DCI carried by CORESET#2) which indicates that a channel correlated (e.g., spatial correlated or spatial quasi co-located) with the SSB#1 is not available to the UE 200. In response thereto, the multiple search spaces for detecting the DCI may be prioritized from small index to large index, and the search spaces corresponding to the CORESET#1, such as search space #0, search space #1, and search space #2, are excluded from the multiple search spaces. That is, the UE 200 will not monitor the search space #0, search space #1, and search space #2 for detecting the DCI. Therefore, the search space #3 with the smallest index among the remained search spaces (i.e., search space #3, search space #4, and search space #5 corresponding to the CORESET#2) would be the first search space to be detected by the UE 200, and the search space #5 with the largest index among the remained search spaces would be the last search space to be detected by the UE 200. In other word, the UE 200 may determine the priorities of search spaces according to an indication (e.g., DCI) received from the BS 100.

In an embodiment, a search space or a CORESET corresponding to the search space is determined to be unavailable according to an indication (e.g., DL-RS and/or DCI). For example, the search space#0, search space#1, and search space#2 and/or the CORESET#1 may be determined to be unavailable to the UE 200 if the BS 100 does not occupy (e.g., due to an LBT failure of the DL-RS#1) the channel correlated with the SSB#1, as illustrated in FIG. 7C.

In an embodiment, a search space or a CORESET corresponding to the search space is determined to be unavailable according to an availability of a channel (or data burst) correlated (e.g., spatial correlated or spatial quasi co-located) with a spatial domain reference signal corresponding to the search space. For example, the search space#0, search space#1, and search space#2 and/or the CORESET#1 may be determined to be unavailable to the UE 200 if a channel (or data burst) correlated (e.g., spatial correlated or spatial quasi co-located) with the SSB#1 is unavailable to the UE 200, as illustrated in FIG. 7C.

Figure 10:
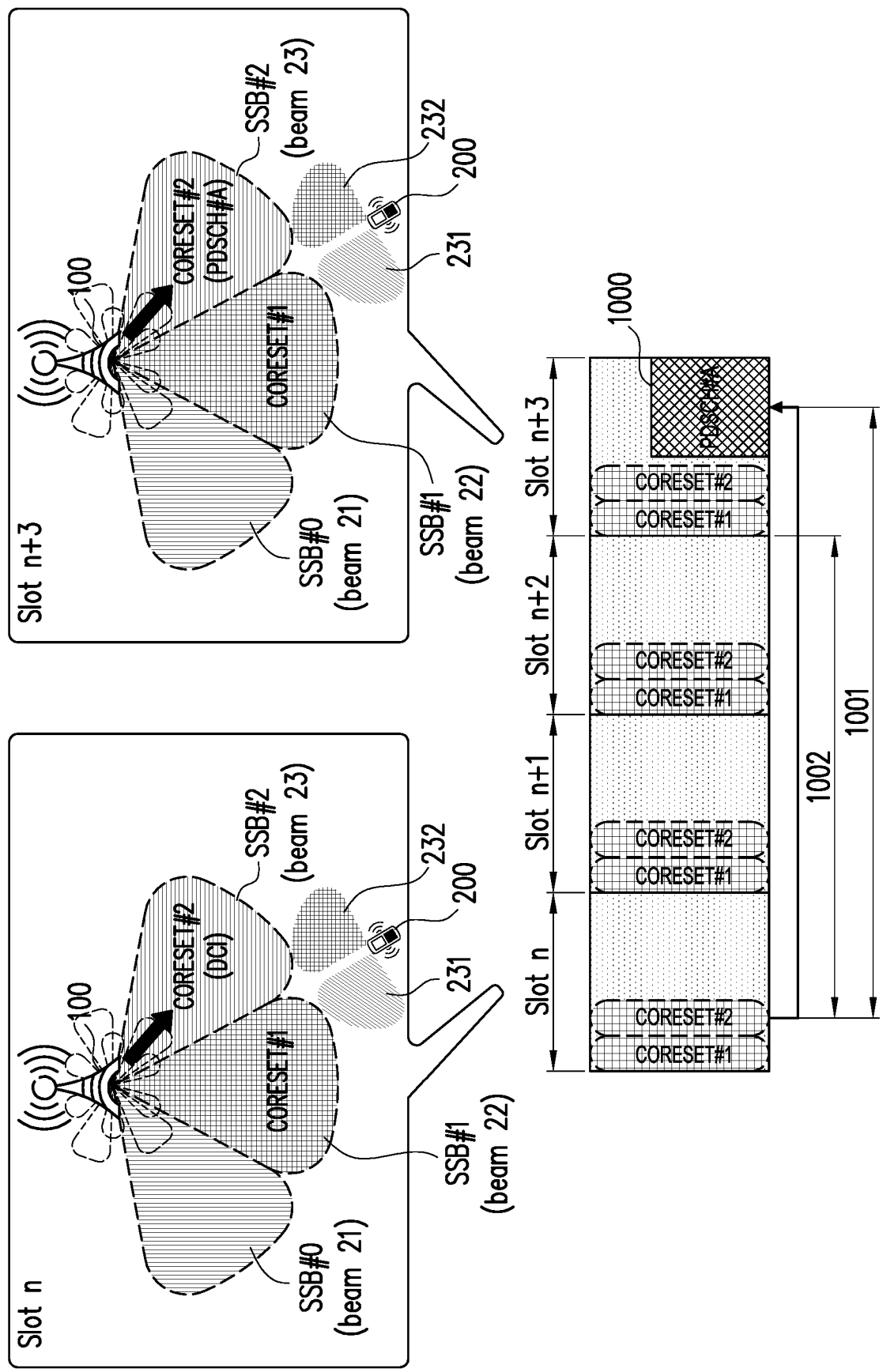
FIG. 10 is a schematic diagram of timing offset between the DCI and the physical downlink shared channel (PDSCH) according to an embodiment of the disclosure.

The UE 200 may access a PDSCH according to a DCI obtained from a CORESET. FIG. 10 is a schematic diagram of timing offset 1001 between the DCI (i.e., the DCI of the CORESET#2) and the PDSCH#A according to an embodiment of the disclosure. The CORESET#2, received by the UE 200 and allocated in the time slot n, may comprise a DCI. The DCI may indicate a resource location 1000 of the PDSCH#A carried by a data burst, wherein the data burst is quasi co-located with the SSB#2, wherein the DCI may further indicate number of PRBs in frequency domain or number of orthogonal frequency-division multiplexing (OFDM) symbols associated with the resource location 1000. Furthermore, the UE 200 may determine an QCL assumption of the PDSCH#A according to the DCI. The UE 200 may access the PDSCH#A according to the resource location 1000 by using the spatial domain receive filter 232 corresponding to the SSB#2. However, times is needed for the UE 200 to demodulate or decode the CORESET#2 so as to obtain DCI. Therefore, if a time interval between the DCI and the PDSCH#A is too short, the UE 200 may not have enough time to determine a spatial domain receive filter for accessing the PDSCH#A according to the DCI. By contrast, if the time interval between the DCI and the PDSCH#A is enough, the UE 200 would configure the spatial domain receive filter 232 for accessing the PDSCH#A according to the DCI in time. It should be noted that, in some embodiments, the DCI indicates the resource location 1000 of the PDSCH#A may be same as or different from the DCI indicates the data burst corresponding to the PDSCH#A is quasi co-located with SSB#2.

Referring to FIG. 10, the UE 200 may access the PDSCH#A by using the spatial domain receive filter 232 correlated with the SSB#2 in response to a timing offset 1001 between the DCI allocated in the CORESET#2 of the time slot n and a resource location 1000 of PDSCH#A is greater than a time threshold 1002 (e.g., 28 OFDM symbols or 2 time slots), wherein the resource location 1000 may be indicated by the DCI comprised in the CORESET#2 allocated in the time slot n. It should be noted that said DCI may comprise a timing offset 1001 and/or a transmission configuration indication (TCI) for the UE 200 to determine, for example, a spatial domain receive filter, wherein the value of the threshold 1002 may be associated with computing capability of the UE 200.

In an embodiment, the timing offset 1001 may be, from example, an offset from the start (or the end) of the DCI (i.e., the DCI which indicates the resource location 1000 of the PDSCH#A) to the start (or the end) of the PDSCH#A or an offset from the start (or the end) of the CORESET carrying the DCI (i.e., CORESET#2) to the start (or the end) of the PDSCH#A.

Figure 11:
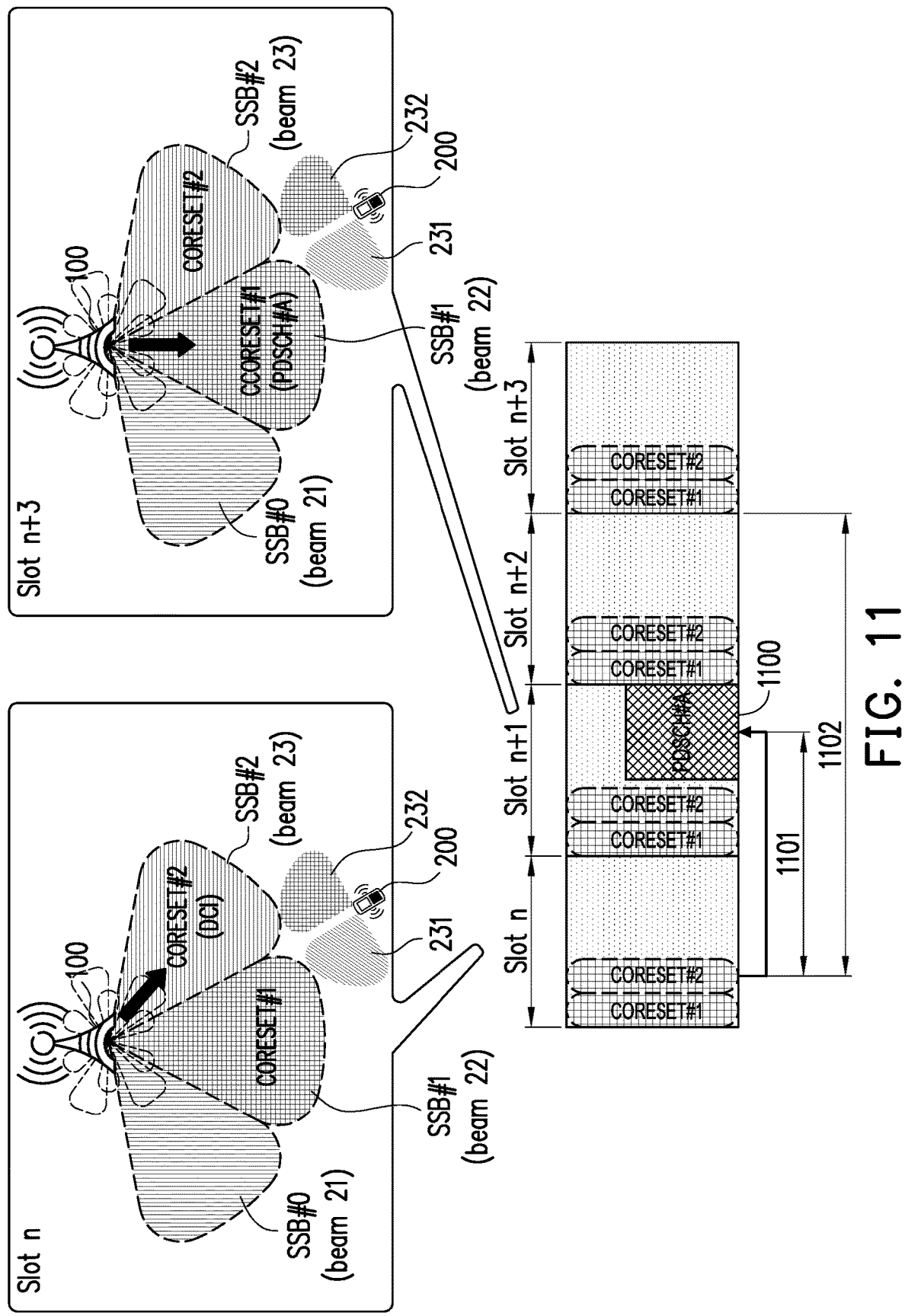
FIG. 11 is a schematic diagram of timing offset between the DCI and the PDSCH according to another embodiment of the disclosure.

FIG. 11 is a schematic diagram of timing offset between the DCI (i.e., the DCI of the CORESET#2) and the PDSCH#A according to another embodiment of the disclosure. The CORESET#2 allocated in the time slot n comprises a DCI, wherein the DCI indicate a resource location 1100 of the PDSCH#A. Since the timing offset 1101 between DCI and the resource location 1100 of the PDSCH#A is too short (e.g., shorter than a time threshold 1102), the UE 200 may not have enough time to determine a spatial domain receive filter for accessing the PDSCH#A according to the DCI. In response there to, the UE 200 may select the spatial domain receive filter 231 quasi co-located with the CORESET#1 which have the lowest CORESET ID index among all of the CORESETs received by (or available to) the UE 200, so as to access the PDSCH#A. That is, the UE 200 may determine an QCL assumption of the PDSCH#A according to a CORESET ID of the CORESET#1 or according to a DCI carried by the CORESET#1. The UE 200 may access, the PDSCH#A by using the spatial domain receive filter 231 instead of using the spatial domain receive filter 232 (e.g., determined according to a TCI the DCI) in response to a timing offset 1101 between the DCI allocated in the CORESET#2 of the time slot n and the resource location 1100 of the PDSCH#A is less than the time threshold 1102 (e.g., 28 OFDM symbols or 2 time slots), wherein the resource location 1100 in the time slot n+1 is indicated by the DCI comprised in the CORESET#2 allocated in the time slot n. It should be noted that, in some embodiments, the CORESET with the lowest CORESET ID index may not be the CORESET#1, the disclosure is not limited thereto.

In an embodiment, the timing offset 1101 may be, from example, an offset from the start (or the end) of the DCI (i.e., the DCI which indicates the resource location 1100 of the PDSCH#A) to the start (or the end) of the PDSCH#A or an offset from the start (or the end) of the CORESET carrying the DCI (i.e., CORESET#2) to the start (or the end) of the PDSCH#A.

Figure 12:
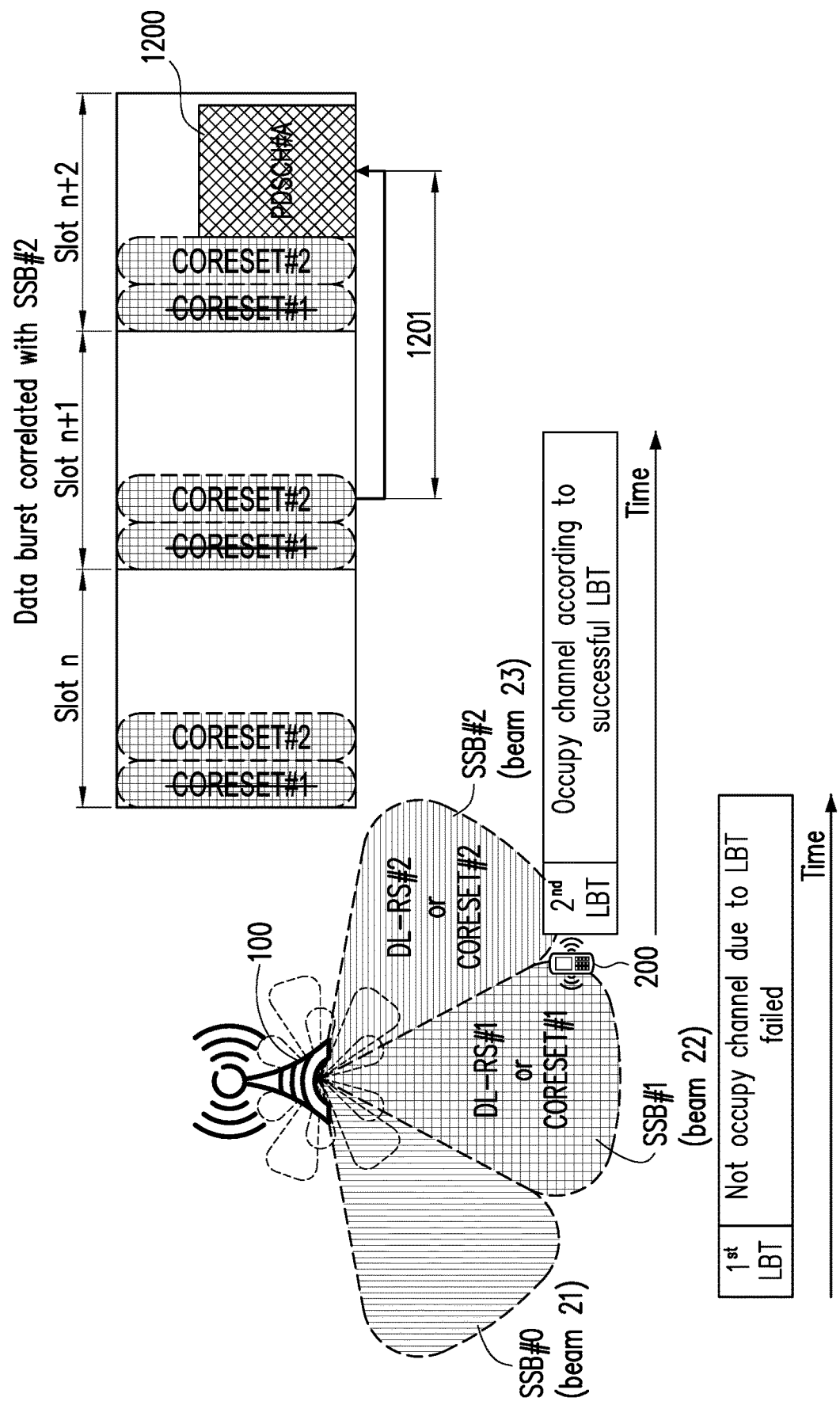
FIG. 12 is a schematic diagram of the case where the CORESET with the lowest CORESET ID is not available to the UE according to an embodiment of the disclosure.

In an embodiment, the CORESET#1 with the lowest CORESET ID index is not received by the UE 200 (or the BS 100 does not configure the CORESET#1 to the UE 200), therefore the UE 200 cannot use the spatial domain receive filter 231 instead of the spatial domain receive filter 232 (e.g., determined according to a TCI the DCI). FIG. 12 is a schematic diagram of the case where the CORESET#1 with the lowest CORESET ID is not available to the UE 200 according to an embodiment of the disclosure, wherein the lowest CORESET ID is not available to the UE 200 may due to, for example, an LBT procedure corresponding to CORESET#1 has failed. The CORESET#2 allocated in the time slot n comprises a DCI, wherein the DCI indicate a resource location 1200 of the PDSCH#A. Since the timing offset 1201 between DCI and the resource location 1200 of the PDSCH#A is too short (e.g., shorter than a threshold such as 28 OFDM symbols or 2 time slots), the UE 200 may not have enough time to determine a spatial domain receive filter for accessing the PDSCH#A. Under normal circumstances, the UE 200 would select the spatial domain receive filter 231 quasi co-located with the CORESET#1 which have the lowest CORESET ID index instead of selecting the spatial domain receive filter 232 (e.g., determined according to a TCI the DCI). However, in some embodiment, the CORESET#1 is not received by the UE 200 due to, for example, an LBT procedure for the CORESET#1 has failed (i.e., the BS 100 would not transmit the CORESET#1). In response to the CORESET#1 with the lowest CORESET ID index is not available to the UE 200, the UE 200 will access the PDSCH#A by using a spatial domain receive filter corresponding to a CORESET, wherein said CORESET has the lowest CORESET ID index among all of the CORESETs available to the UE 200. That is, the UE 200 will access the PDSCH#A by using the spatial domain receive filter 232 which has been used for receiving the CORESET#2 since the CORESET#2 has the lowest CORESET ID index among all of the CORESETs available to the UE 200.

In an embodiment, the timing offset 1201 may be, from example, an offset from the start (or the end) of the DCI (i.e., the DCI which indicates the resource location 1200 of the PDSCH#A) to the start (or the end) of the PDSCH#A or an offset from the start (or the end) of the CORESET carrying the DCI (i.e., CORESET#2) to the start (or the end) of the PDSCH#A.

Figure 13:
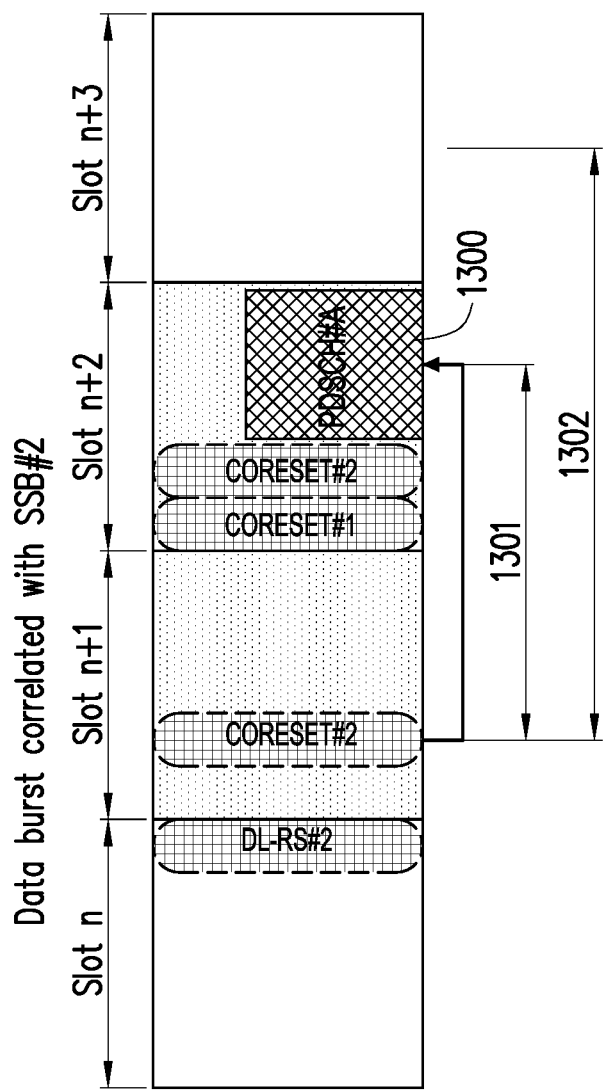
FIG. 13 is a schematic diagram of accessing a PDSCH based on pre-determined rules according to an embodiment of the disclosure.

In an embodiment, the UE 200 access a PDSCH indicated by a DCI according to pre-determined rules. FIG. 13 is a schematic diagram of accessing a PDSCH#A based on pre-determined rules according to an embodiment of the disclosure. The CORESET#2, received by the UE 200 and allocated in the time slot n+1, comprises a DCI, wherein the DCI indicate a resource location 1300 of the PDSCH#A so as to indicate the UE 200 to access the PDSCH#A by using the spatial domain receive filter 232 corresponding to the CORESET#2. In the case a timing offset 1301 of the DCI allocated in CORESET#2 of the time slot n+1 and the resource location 1300 of the PDSCH#A is less than a time threshold 1302, the UE 200 may access the PDSCH#A according to pre-determined rules instead of the indication (e.g., TCI) of the DCI. The UE 200 may access the PDSCH#A by using a spatial domain receive filter corresponding to a CORESET, wherein said CORESET and the PDSCH#A are allocated in the same time slot n+2. Specifically, the UE 200 may access the PDSCH#A by using a spatial domain receive filter corresponding to a specific CORESET in response to the specific CORESET being the CORESET with the lowest CORESET ID index among a plurality of available CORESETs within the time slot n+2. For example, the UE 200 may access the PDSCH#A by using the spatial domain receive filter 231 corresponding to the CORESET#1 in the time slot n+2 since the CORESET#1 has the lowest CORESET ID among the available CORESETs received by the UE 200 during the time slot n+2 (i.e., CORESET#1 and CORESET#2 in the time slot n+2). If the UE 200 does not receive any CORESET (or the BS 100 does not configure any CORESET to the UE 200) during current time slot n+2 (e.g., due to an LBT failure), the UE may access the PDSCH#A by using the spatial domain receive filter 232 corresponding to the CORESET#2 within a previous time slot n+1 since the CORESET#2 within the previous time slot n+1 has the lowest ID among the available CORESETs received by the UE during the time slot n+1.

In an embodiment, the timing offset 1301 may be, from example, an offset from the start (or the end) of the DCI (i.e., the DCI which indicates the resource location 1300 of the PDSCH#A) to the start (or the end) of the PDSCH#A or an offset from the start (or the end) of the CORESET carrying the DCI (i.e., CORESET#2) to the start (or the end) of the PDSCH#A.

In an embodiment, the UE 200 may access the PDSCH#A by using a spatial domain receive filter corresponding to a specific CORESET in response to the specific CORESET being the CORESET with the lowest ID among a plurality of CORESETs within in a time slot previous to the current time slot carrying the PDSCH#A. For example, if the UE 200 does not receive any CORESET (or the BS 100 does not configure any CORESET to the UE 200) during current time slot n+2 (e.g., due to an LBT failure), the UE 200 access the PDSCH#A by using the spatial domain receive filter 231 corresponding to the CORESET#1 within the previous time slot n+1 since the CORESET#2 within the previous time slot n+1 is the last CORESET received by the UE 200.

On the other hand, the UE 200 may access the PDSCH#A by using a spatial domain receive filter corresponding to a specific CORESET in response to the specific CORESET being the last CORESET received by the UE 200 or in response to the specific CORESET being the last COREEST received by the UE 200 during the current time slot (i.e., time slot n+2). For example, the UE 200 may access the PDSCH#A by using the spatial domain receive filter 232 corresponding to the CORESET#2 since the CORESET#2 is the last CORESET received by the UE 200 during the current time slot n+2. If the UE 200 does not receive any CORESET (or the BS 100 does not configure any CORESET to the UE 200) during current time slot n+2 (e.g., due to an LBT failure), the UE 200 may access the PDSCH#A by using the spatial domain receive filter 232 corresponding to the CORESET#2 within the previous time slot n+1 since the CORESET#2 within the previous time slot n+1 is the last CORESET received by the UE 200.

In an embodiment, the UE 200 may access the PDSCH#A by using a spatial domain receive filter according to a predefined state (e.g., lowest ID index) of an indication (e.g., Transmission Configuration Indication, TCI) which is configured for indicating a QCL assumption for PDSCH reception.

Figure 14:
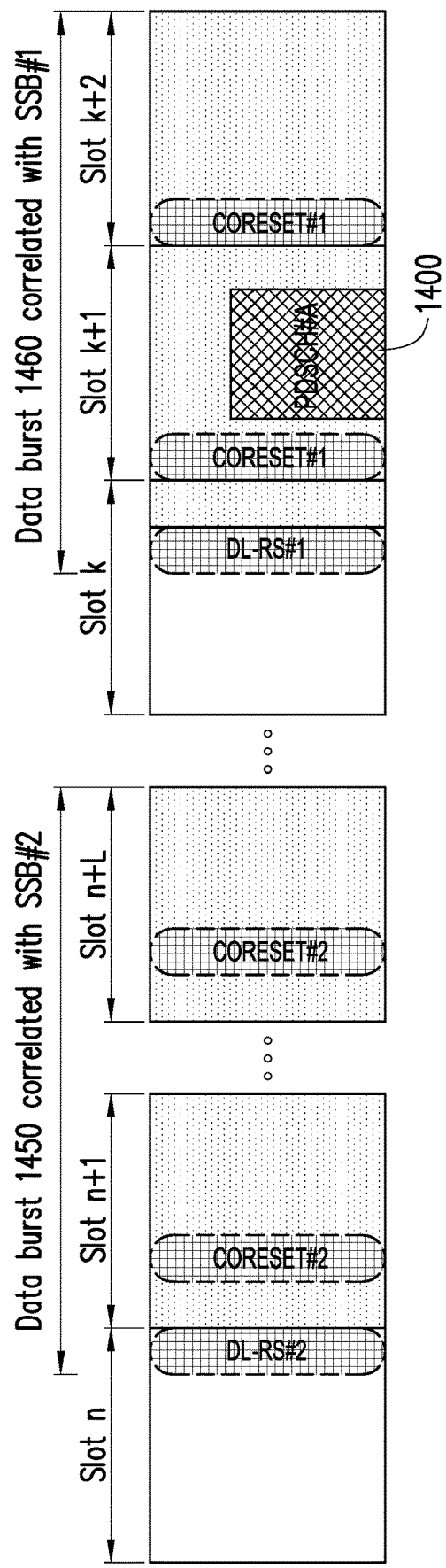
FIG. 14 is a schematic diagram of a scheduling across data bursts according to an embodiment of the disclosure.

In an embodiment, a CORESET and a PDSCH indicated by a DCI of the CORESET may be respectively corresponded to different data bursts or may be respectively spatial correlated (e.g., spatial quasi co-located) with different spatial domain reference signals. FIG. 14 is a schematic diagram of a scheduling across data bursts according to an embodiment of the disclosure. The CORESET#2, received by the UE 200 and allocated in the time slot n+L, comprises a DCI. The DCI indicate a resource location 1400 of the PDSCH#A, wherein the CORESET#2 (or the DCI comprised in the CORESET#2) and the resource location 1400 are respectively allocated in the data burst 1450 quasi co-located with the SSB#2 and the data burst 1460 quasi co-located with the SSB#1. That is, the PDSCH#A is not related to the SSB#2. In response to the CORESET#2 and the resource location 1400 are respectively spatial quasi co-located with different spatial domain reference signals (i.e., SSB#2 and SSB#1), the UE 200 may access the PDSCH#A by using the spatial domain receive filter 231 corresponding to the SSB#1 instead of using the spatial domain receive filter 232 (e.g., determined according to a TCI of the DCI) corresponding to the SSB#2.

Figure 15:
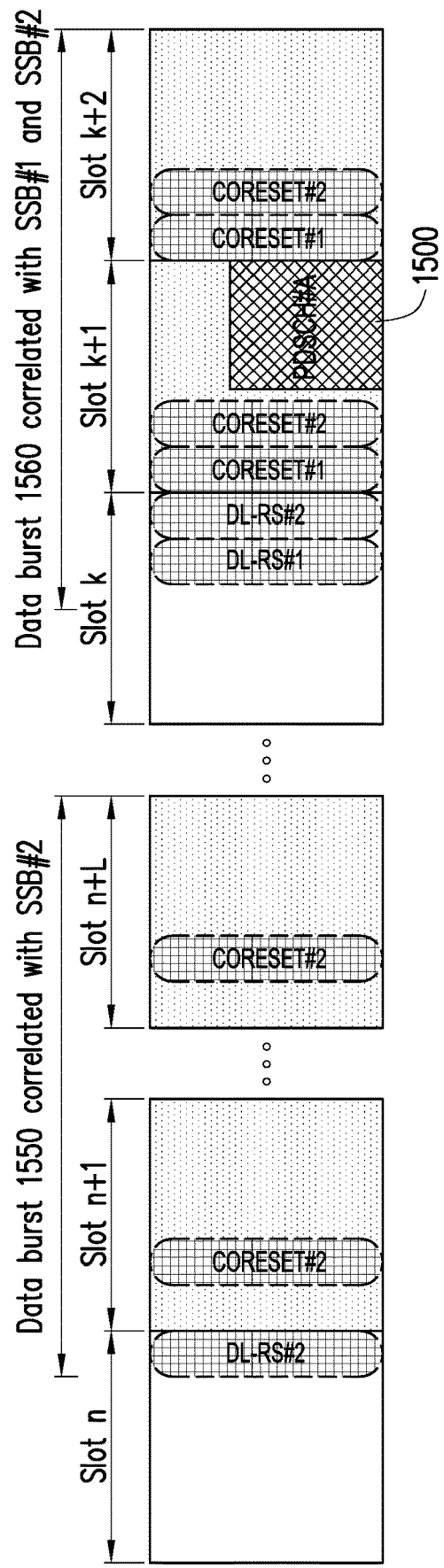
FIG. 15 is a schematic diagram of a scheduling across data bursts according to another embodiment of the disclosure.

FIG. 15 is a schematic diagram of a scheduling across data bursts according to another embodiment of the disclosure. The CORESET#2, received by the UE 200 and allocated in the time slot n+L, comprises a DCI. The DCI indicate a resource location 1500 of the PDSCH#A, wherein the CORESET#2 (or the DCI comprised in the CORESET#2) and the resource location 1500 are respectively allocated in the data burst 1550 and the data burst 1560. The data burst 1550 is spatial quasi co-located with SSB#2, and the data burst 1560 is spatial quasi co-located with both SSB#1 and SSB#2. Since part of the data burst 1560 may be spatial correlated with the data burst 1550 (e.g., data burst 1550 and data burst 1560 are transmitted by the same beam in different time), the UE 200 may access the PDSCH#A by using the spatial domain receive filter 232 according to the DCI obtained from the CORESET#2 which is allocated in the time slot n+L. In one example, the UE 200 may access the PDSCH#A by using a spatial domain receive filter according to a predefined state (e.g., lowest ID index) of an indication (e.g., TCI) which is configured for indicating a QCL assumption for PDSCH reception.

Figure 16:
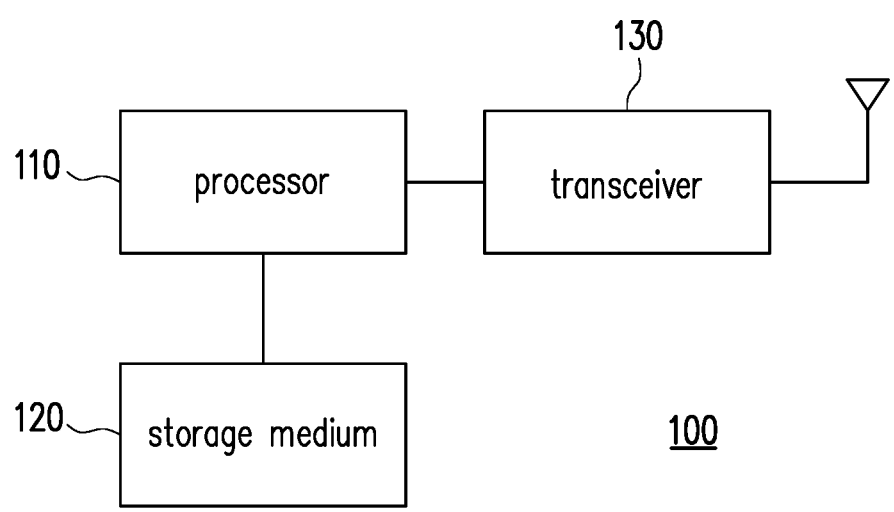
FIG. 16 is a schematic diagram of a BS according to an embodiment of the disclosure.

FIG. 16 is a schematic diagram of a BS 100 according to an embodiment of the disclosure, wherein the BS 100 may be, for example, a gNB, a macro cell, a micro cell, a pico cell, a femto cell, a evolved node B (eNB), an advanced BS (ABS), a base transceiver system (BTS), an access point, or a relay station which serves the UE 200. The BS 100 includes (but not limited to) a processor 110, a storage medium 120, and a transceiver 130.

The processor 110 is, for example, a Central Processing Unit (CPU), or other programmable general purpose or special purpose microprocessor, a Digital Signal Processor (DSP), a programmable controller, an Application Specific Integrated Circuit (ASIC), a Graphics Processing Unit (GPU) or other similar components or a combination of the above components.

The storage medium 120 is coupled to the processor 110, and is, for example, any type of a fixed or movable Random Access Memory (RAM), a Read-Only Memory (ROM), a flash memory, a Hard Disk Drive (HDD), a Solid State Drive (SSD), or similar components or a combination of the above components. The storage medium 120 stores a plurality of modules or programs for the processor 110 to access, such that the processor 110 may execute various functions of the BS 100.

The transceiver 130 is coupled to the processor 110. The transceiver 130 may transmit an DL signal and receive an uplink (UL) signal. The transceiver 130 may execute operations of Low Noise Amplifying (LNA), impedance matching, frequency mixing, up-down frequency conversion, filtering, amplifying and/or similar operations. The transceiver 130 may further includes an antenna array, and the antenna array may include one or a plurality of antennas for transmitting and receiving omnidirectional antenna beams or directional antenna beams.

Figure 17:
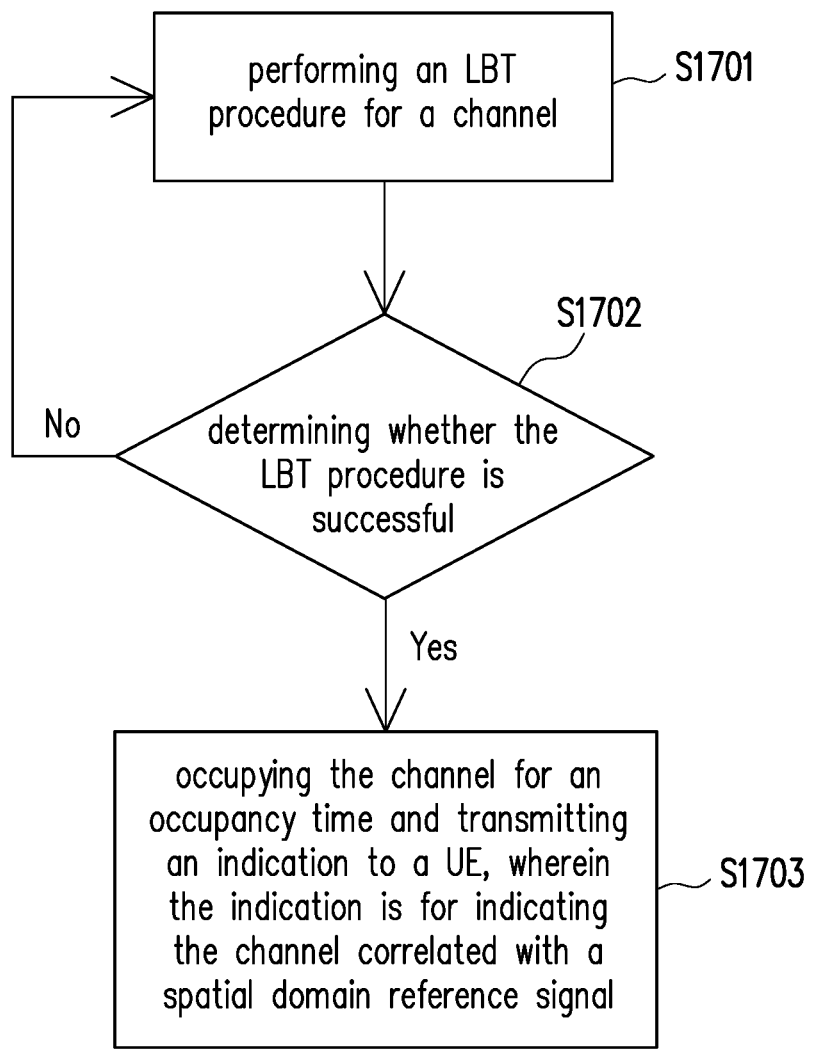
FIG. 17 is a flowchart illustrating a method for occupying a channel according to an embodiment of the disclosure.

FIG. 17 is a flowchart illustrating a method for occupying a channel according to an embodiment of the disclosure, wherein the method may be used by the BS 100. In step S1701, the BS 100 performs an LBT procedure for a channel. In step S1702, the BS 100 determines whether the LBT procedure is successful. If the LBT procedure is successful, proceeding to step S1703. If the LBT procedure is failed, proceeding to step S1701. In step S1703, the BS 100 occupies the channel for an occupancy time and transmits an indication to a UE (e.g., UE 200 as illustrated in FIG. 18), wherein the indication is for indicating the channel correlated (e.g., spatial quasi co-located) with a spatial domain reference signal which may have been received by the UE.

Figure 18:
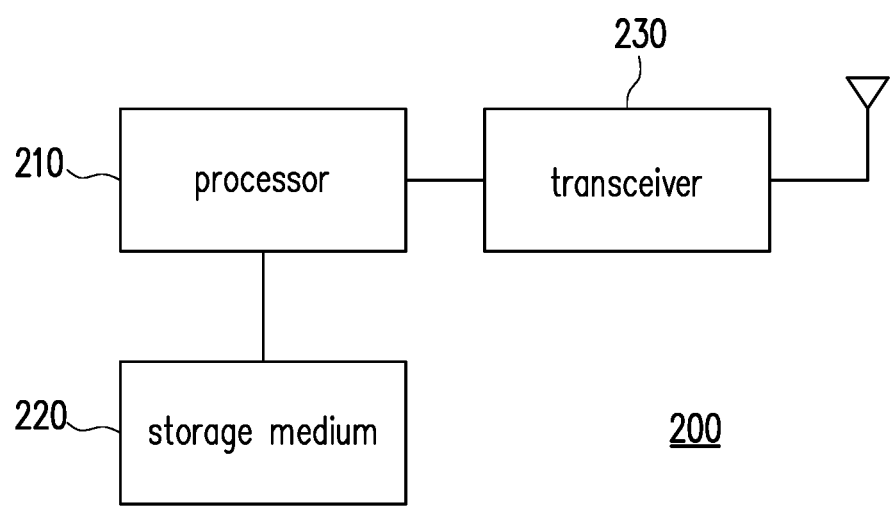
FIG. 18 is a schematic diagram of a UE according to an embodiment of the disclosure.

FIG. 18 is a schematic diagram of a UE 200 according to an embodiment of the disclosure. The UE 200 includes (but not limited to) a processor 210, a storage medium 220, and a transceiver 230.

The processor 210 is, for example, a CPU, or other programmable general purpose or special purpose microprocessor, a DSP, a programmable controller, an ASIC, a GPU or other similar components or a combination of the above components.

The storage medium 220 is coupled to the processor 210, and is, for example, any type of a fixed or movable RAM, a ROM, a flash memory, a HDD, a SSD, or similar components or a combination of the above components. The storage medium 220 stores a plurality of modules or programs for the processor 210 to access, such that the processor 210 may execute various functions of the UE 200.

The transceiver 230 is coupled to the processor 210. The transceiver 230 may transmit an UL signal and receive a DL signal. The transceiver 230 may execute operations of LNA, impedance matching, frequency mixing, up-down frequency conversion, filtering, amplifying and/or similar operations. The transceiver 230 may further includes an antenna array, and the antenna array may include one or a plurality of antennas for transmitting and receiving omnidirectional antenna beams or directional antenna beams.

Figure 19:
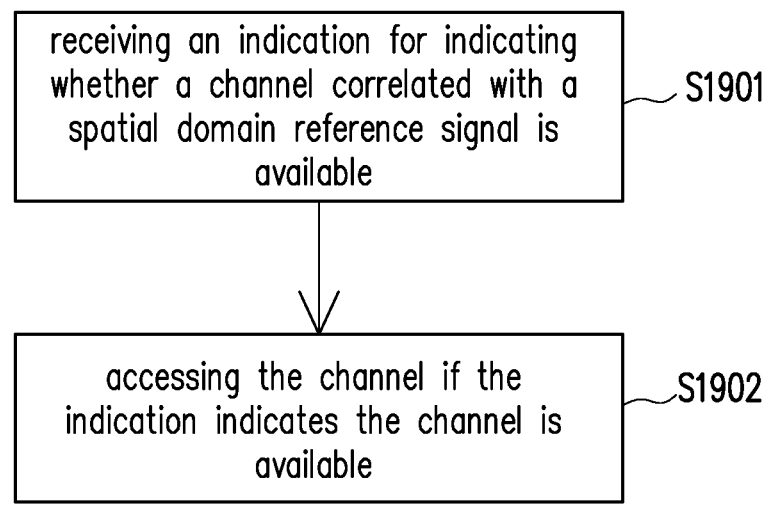
FIG. 19 is a flowchart illustrating a method for DL reception in an unlicensed band according to an embodiment of the disclosure.

FIG. 19 is a flowchart illustrating a method for DL reception in an unlicensed band according to an embodiment of the disclosure, wherein the method may be used by the UE 200. In step S1901, the UE 200 receives, by the transceiver 230, an indication for indicating whether a channel (or a data burst) correlated (e.g., spatial quasi co-located) with a spatial domain reference signal is available, wherein the spatial domain reference signal may have been received by the UE 200. In step S1902, the UE 200 accesses, by the transceiver 230, the channel if the indication indicates the channel is available.

It should be noted that the method for DL reception in the disclosure may performed by the UE 200 in a licensed band (i.e., by the UE 200 served by a licensed BS). For example, the indication may indicate the UE 200 whether a data will be transmitted to the UE 200. If the data to be transmitted exists, the indication may further indicate that which spatial domain reference signal is correlated to the data. Therefore, unnecessary PDCCH blind detection performed by the UE 200 may be prevent.

In view of the aforementioned descriptions, the disclosure is suitable for a UE to perform DL reception in an unlicensed band in case of the UE is located in an area served by multiple beams. The UE may determine to receive a DL signal from a BS beam through an appropriate spatial domain receive filter corresponding to a spatial domain reference signal which is spatial correlated with the BS beam and has been received by the UE. In this way, the UE may determine the appropriate spatial domain receive filter according to the spatial domain reference signal.

The term "at least one of A or B" described above may be replaced by "at least one of A or at least one of B" or "at least one selected from the group of A and B".

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for downlink reception used by a user equipment, the method comprising:
    receiving an indication for indicating whether a channel correlated with a spatial domain reference signal is available; and
    accessing the channel if the indication indicates the channel is available, comprising:
        receiving a signal of the channel by using a spatial domain receive filter, wherein the spatial domain receive filter is determined according to the signal having the same quasi co-location assumption with the spatial domain reference signal by the user equipment.

2. The method of claim 1, wherein the downlink reception is performed in an unlicensed band.

3. The method of claim 1, further comprising:
    receiving the indication by using the spatial domain receive filter corresponding to the spatial domain reference signal.

4. The method of claim 1, wherein the downlink reception is performed by the user equipment on a bandwidth part of a serving cell.

5. The method of claim 1, wherein the spatial domain reference signal is one of a synchronization signal block and a channel state information reference signal.

6. The method of claim 1, wherein the step of receiving the indication for indicating whether the channel correlated with the spatial domain reference signal is available comprising:
obtaining the indication from at least one downlink reference signal.

7. The method of claim 6, wherein the at least one downlink reference signal comprises a first downlink reference signal and a second downlink reference signal, wherein the first downlink reference signal and the second downlink reference signal are respectively allocated in at least one of different time-division multiplexed resources, different frequency-division multiplexed resources, different spatial-division multiplexed resources, or different code-division multiplexed resources.

8. The method of claim 6, wherein the at least one downlink reference signal is configured within a bandwidth part pre-configured to the user equipment.

9. The method of claim 6, wherein a bandwidth of the at least one downlink reference signal is above 80 percentage of 20 MHz.

10. The method of claim 6, wherein the at least one downlink reference signal is transmitted by a single antenna port.

11. The method of claim 6, wherein the at least one downlink reference signal is a channel state information reference signal.

12. The method of claim 1, wherein the step of receiving the indication for indicating whether the channel correlated with the spatial domain reference signal is available comprising:
obtaining the indication from a downlink control information.

13. The method of claim 12, wherein the downlink control information comprise at least one of the following: number of slots within the channel; number of time slots comprising an uplink resource within the channel; number of time slots comprising a downlink resource within the channel; number of uplink symbols in at least one time slot within the channel; or number of downlink symbols in at least one time slot within the channel.

14. The method of claim 12, wherein the indication comprises a data bit, and the data bit indicates whether the channel corresponding to the spatial domain reference signal is available.

15. The method of claim 1 further comprising:
determining, according to the indication, priorities of a plurality of search spaces from small index to large index.

16. The method of claim 15, wherein a first search space of the plurality of search spaces has higher priority than a second search space of the plurality of search spaces if the first search space is available and the second search space is not available.

17. The method of claim 1, wherein a search space is available if the corresponding spatial domain reference signal is available.

18. The method of claim 1 further comprising:
determining, according to the indication, whether each of a plurality of search spaces is available.

19. The method of claim 1 further comprising:
obtaining a resource location of a physical downlink shared channel in a time slot from a downlink control information.

20. The method of claim 19 further comprising:
determining a quasi co-location assumption of the physical downlink shared channel according to at least one of the indication or an ID of a control resource set.

21. The method of claim 20, wherein the control resource set has the lowest control resource set ID among a plurality of available control resource sets.

22. The method of claim 21, wherein the plurality of available control resource sets are received in a previous time slot.

23. A user equipment comprising:
a transceiver; and
a processor connects to the transceiver and configured at least to:
receive, via the transceiver, an indication for indicating whether a channel correlated with a spatial domain reference signal is available; and
access, via the transceiver, the channel if the indication indicates the channel is available by:
receiving a signal of the channel by using a spatial domain receive filter, wherein the spatial domain receive filter is determined according to the signal having the same quasi co-location assumption with the spatial domain reference signal by the user equipment.

24. The method of claim 19, wherein a timing offset between the downlink control information and the physical downlink shared channel is less than a time threshold.

25. The method of claim 19, wherein a timing offset between the downlink control information and the physical downlink shared channel is larger than a time threshold.

26. The method of claim 19, wherein the downlink control information and the physical downlink shared channel are transmitted in different data bursts.

27. The method of claim 1 further comprising:
determining, according to the indication, whether each of a plurality of control resource set is available.

28. The method of claim 21, wherein the plurality of available control resource sets are received in the time slot.

\* \* \* \* \*